United States Patent
Werner et al.

(10) Patent No.: US 10,082,641 B2
(45) Date of Patent: *Sep. 25, 2018

(54) SOLAR TROUGH FRAME, PART AND METHOD

(71) Applicants: Craig Roy Werner, Lake Forest, IL (US); Kurt James Werner, Lake Forest, IL (US); John Funai, Lake in the Hills, IL (US)

(72) Inventors: Craig Roy Werner, Lake Forest, IL (US); Kurt James Werner, Lake Forest, IL (US); John Funai, Lake in the Hills, IL (US)

(73) Assignee: Werner Extrusion Solutions LLC, Libertyville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/537,577

(22) Filed: Nov. 10, 2014

(65) Prior Publication Data

US 2015/0062728 A1    Mar. 5, 2015

Related U.S. Application Data

(63) Continuation of application No. 12/583,787, filed on Aug. 26, 2009, now Pat. No. 8,887,470.

(Continued)

(51) Int. Cl.
*E04H 12/00* (2006.01)
*G02B 7/183* (2006.01)
(Continued)

(52) U.S. Cl.
CPC ............ *G02B 7/183* (2013.01); *F16M 11/18* (2013.01); *F16M 13/022* (2013.01); *F24J 2/14* (2013.01);
(Continued)

(58) Field of Classification Search
CPC ........ G02B 7/183; F24J 2/5201; F24J 2/5203; F24J 2/5232; F24J 2/541; F24J 2/14;
(Continued)

(56) References Cited

U.S. PATENT DOCUMENTS 3,466,119 A * 9/1969 Francia ...................... F24J 2/10
126/602
3,977,800 A * 8/1976 Cassel ................... F16B 7/0446
403/172

(Continued)

*Primary Examiner* — Brian E Glessner
*Assistant Examiner* — Joshua K Ihezie
(74) *Attorney, Agent, or Firm* — Angel M. Schwartz

(57) ABSTRACT

A solar trough frame for holding solar mirrors includes a plurality of chords. The frame includes a plurality of extruded profiles, including chords, chord sleeves, struts, strut end pieces and mirror support pieces, each chord sleeve having at least one chord sleeve fin, each chord sleeve positioned about one of the chords. The frame includes a plurality of struts, at least one of the struts having a strut end piece having at least one strut fin that connects with a chord sleeve fin to connect the plurality of chords. The frame includes a platform supported by the chords and struts on which the solar mirrors are disposed. A chord sleeve for connecting a chord of a solar frame which supports solar mirrors to a strut end piece extending from a strut of the solar frame. A strut end piece for connecting the strut of a solar frame which supports solar mirrors to a chord sleeve of the solar frame. A method for linking a strut of a solar frame which supports solar mirrors to a chord of the solar frame. A method for supporting solar mirrors.

12 Claims, 34 Drawing Sheets

Related U.S. Application Data

(60) Provisional application No. 61/190,573, filed on Aug. 29, 2008.

(51) Int. Cl.
| | | |
|---|---|---|
| *F24S 23/74* | (2018.01) | |
| *F24S 25/00* | (2018.01) | |
| *F24S 25/30* | (2018.01) | |
| *F24S 25/12* | (2018.01) | |
| *F24S 25/13* | (2018.01) | |
| *F24S 30/425* | (2018.01) | |
| *F24J 2/14* | (2006.01) | |
| *F24J 2/52* | (2006.01) | |
| *F24J 2/54* | (2006.01) | |
| *F16M 11/18* | (2006.01) | |
| *F16M 13/02* | (2006.01) | |
| *F24S 23/70* | (2018.01) | |
| *F24J 2/10* | (2006.01) | |

(52) U.S. Cl.
CPC .......... *F24J 2/5232* (2013.01); *F24J 2/5233* (2013.01); *F24J 2/541* (2013.01); *F24S 23/74* (2018.05); *F24S 25/00* (2018.05); *F24S 25/12* (2018.05); *F24S 25/13* (2018.05); *F24S 25/30* (2018.05); *F24S 30/425* (2018.05); *F24J 2002/1085* (2013.01); *F24S 2023/874* (2018.05); *Y02E 10/45* (2013.01); *Y02E 10/47* (2013.01); *Y10T 29/49826* (2015.01)

(58) Field of Classification Search
CPC .. F24J 2/5233; F24J 2002/1085; F16M 11/18; F16M 13/022; Y10T 29/49826; Y02E 10/47; Y02E 10/45
USPC .......... 52/633, 648.1, 653.1, 653.2; 126/600
See application file for complete search history.

(56) References Cited

U.S. PATENT DOCUMENTS

| | | | | |
|---|---|---|---|---|
| 3,999,351 A | * | 12/1976 | Rensch | E04B 1/2403 52/280 |
| 4,056,309 A | * | 11/1977 | Harbison | G02B 26/0825 126/570 |
| 4,122,646 A | * | 10/1978 | Sapp | E04G 1/06 403/171 |
| 4,154,219 A | * | 5/1979 | Gupta | F24J 2/062 126/575 |
| 4,247,218 A | * | 1/1981 | Jeannin | E04B 1/1903 403/217 |
| 4,312,326 A | * | 1/1982 | Johnson, Jr. | F24J 2/125 126/573 |
| 4,432,661 A | * | 2/1984 | Phillips | E04B 1/3211 403/172 |
| 4,569,165 A | * | 2/1986 | Baker | B29C 66/534 156/294 |
| 4,904,108 A | * | 2/1990 | Wendel | E04B 1/1912 403/170 |
| 5,224,320 A | * | 7/1993 | Mai | E04B 1/1903 403/171 |
| 5,435,110 A | * | 7/1995 | Stol | B62D 23/005 403/170 |
| 6,205,739 B1 | * | 3/2001 | Newlin | E04B 1/19 52/645 |
| 6,485,152 B2 | * | 11/2002 | Wood | F24J 2/10 126/696 |
| 6,892,502 B1 | * | 5/2005 | Hubbell | E01F 9/0113 40/584 |
| 7,207,137 B2 | * | 4/2007 | Wagner | E01C 9/005 47/32 |
| 7,578,109 B2 | * | 8/2009 | Reynolds | E04B 1/19 52/638 |
| 7,587,862 B2 | * | 9/2009 | Reynolds | E04B 1/19 52/648.1 |
| 7,823,347 B1 | * | 11/2010 | Blinn | B66C 23/62 182/186.7 |
| 7,823,583 B2 | * | 11/2010 | Allen | F24J 2/16 126/684 |
| 8,887,470 B2 | * | 11/2014 | Werner | F24J 2/14 126/600 |
| 2005/0072103 A1 | * | 4/2005 | Hopwood | E04C 5/165 52/633 |
| 2006/0053726 A1 | * | 3/2006 | Reynolds | E04B 1/19 52/633 |
| 2007/0011983 A1 | * | 1/2007 | Reynolds | E04B 1/19 52/633 |
| 2007/0261355 A1 | * | 11/2007 | Carlisle | H01Q 1/1242 52/633 |
| 2008/0072516 A1 | * | 3/2008 | Reynolds | E04B 1/19 52/694 |
| 2008/0204352 A1 | * | 8/2008 | Reynolds | E04B 1/19 343/880 |
| 2009/0113816 A1 | * | 5/2009 | Kling | A47C 4/022 52/81.3 |
| 2010/0005752 A1 | * | 1/2010 | Hawkins | E04B 1/1903 52/655.1 |

* cited by examiner

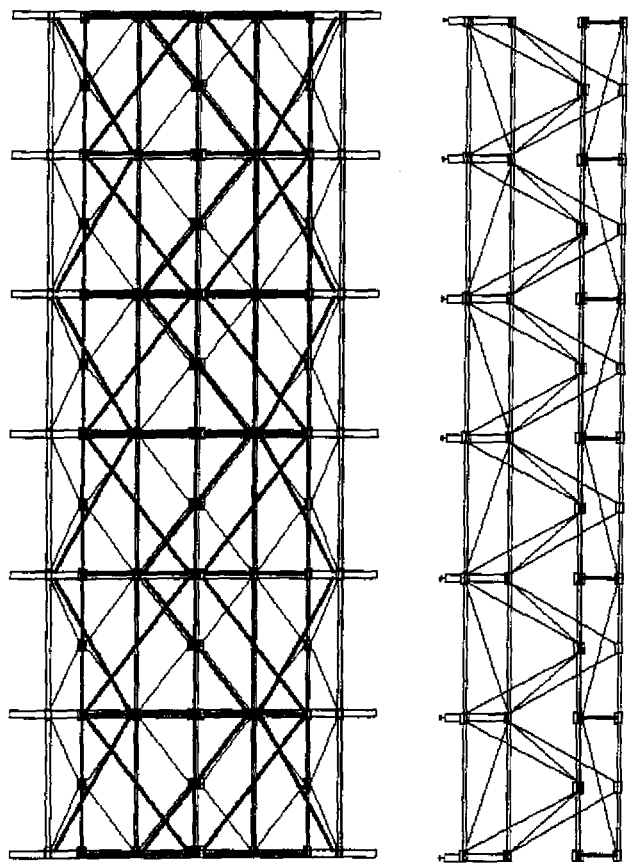
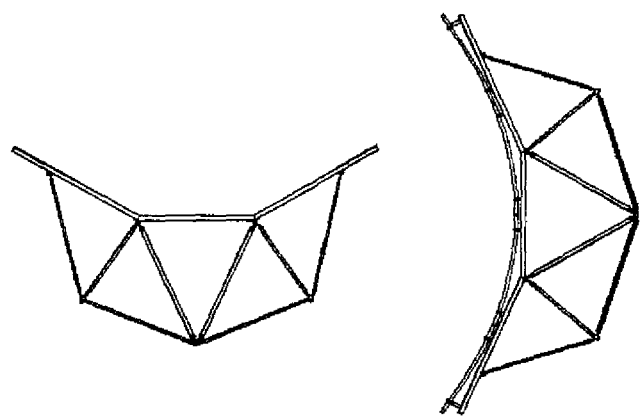
FRAME OVERVIEW
FIGURE 2

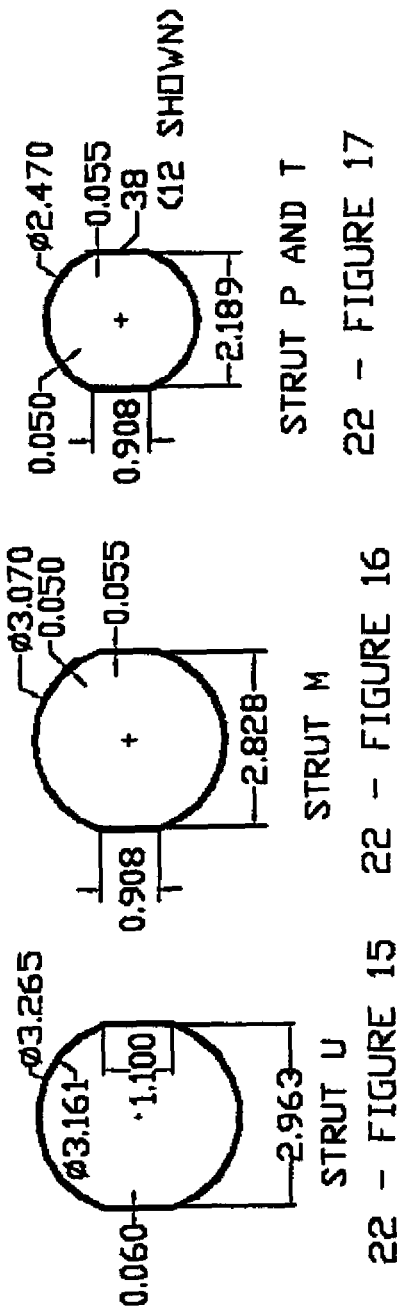

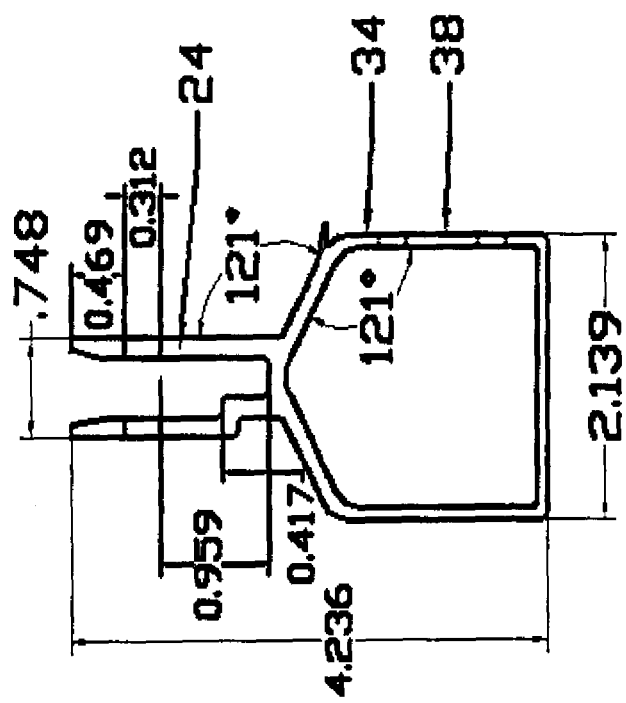
PART 17 – FIGURE 21

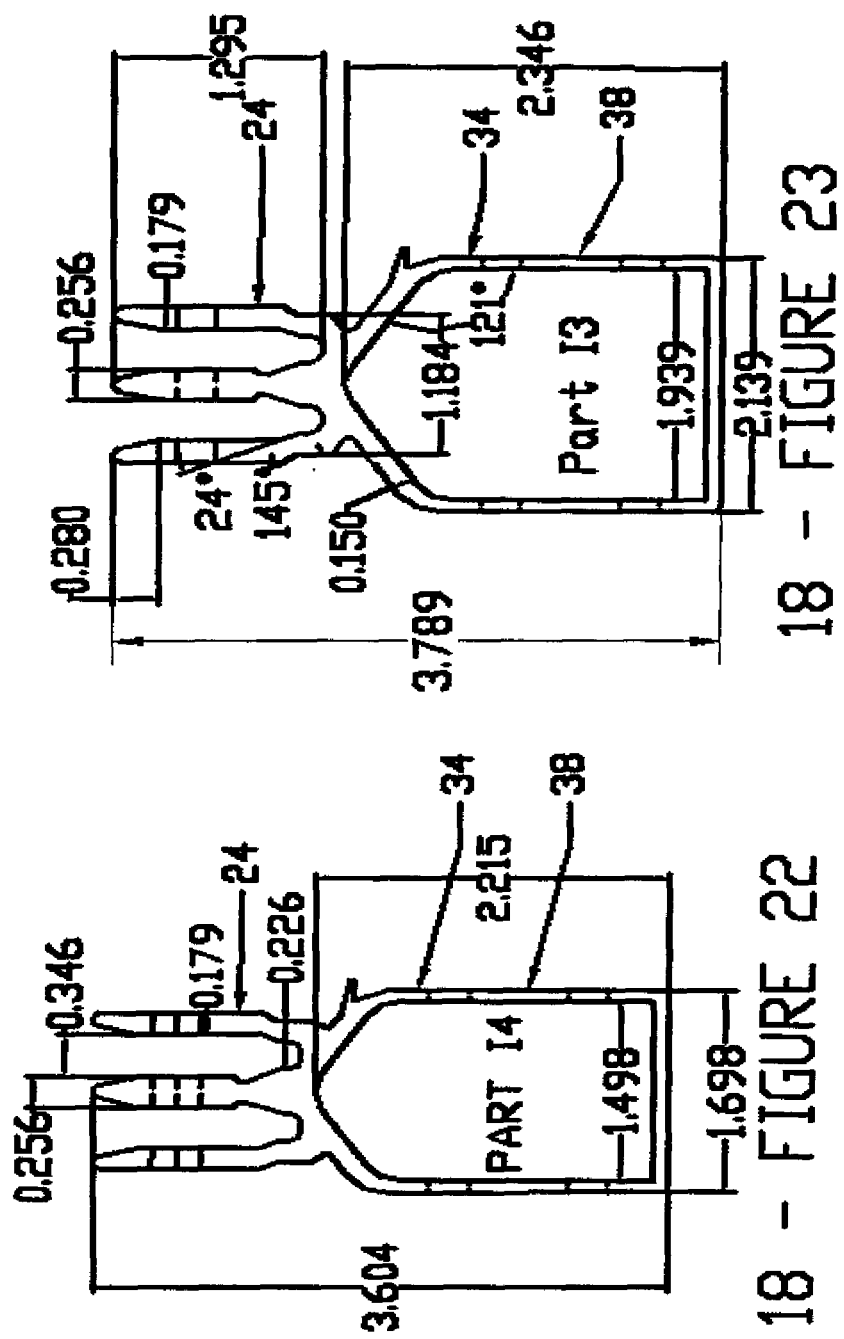

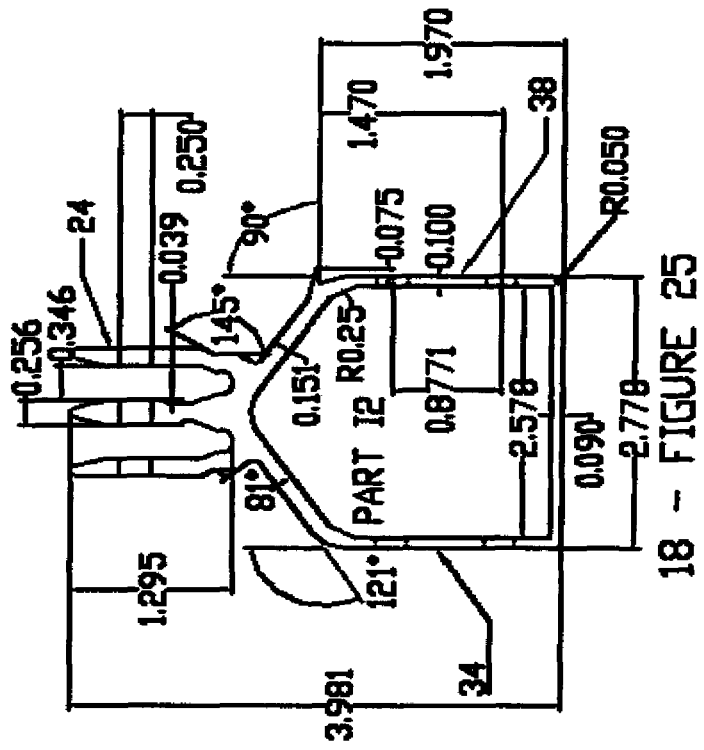
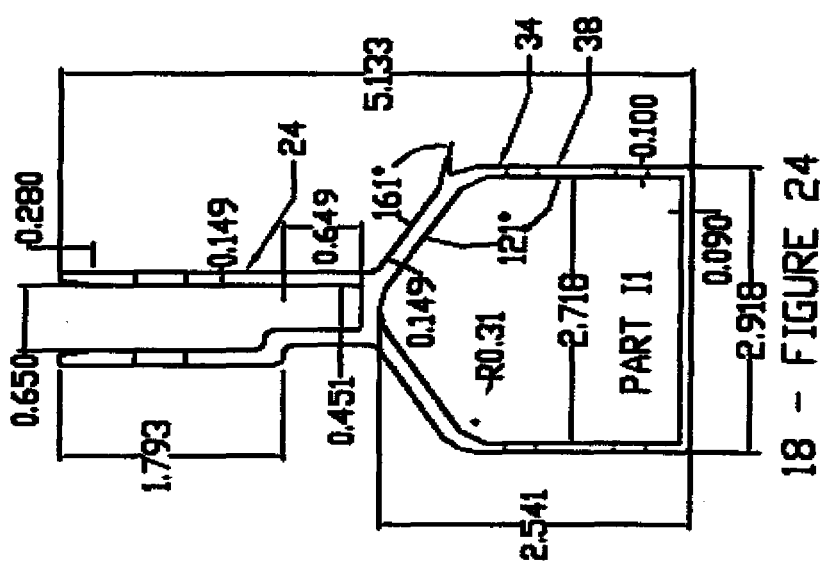

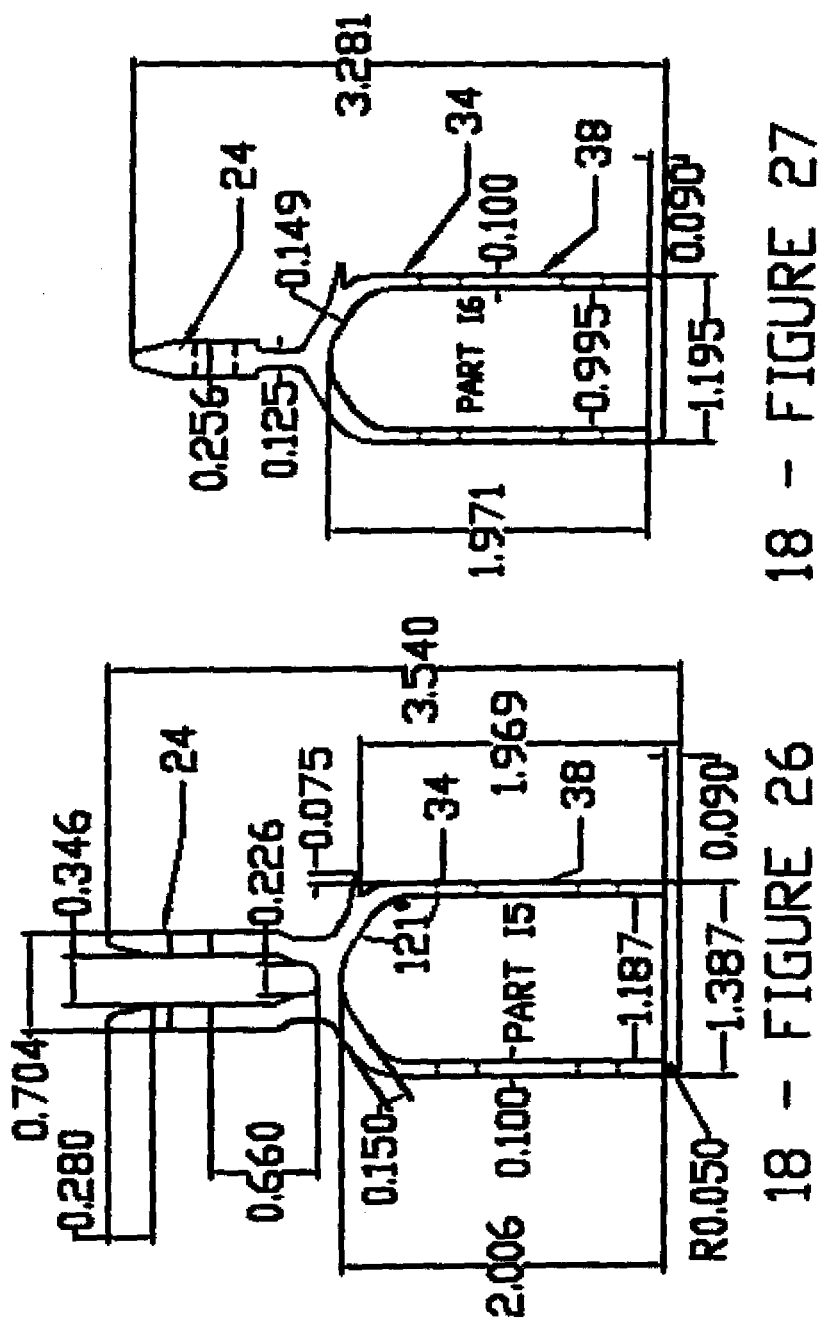

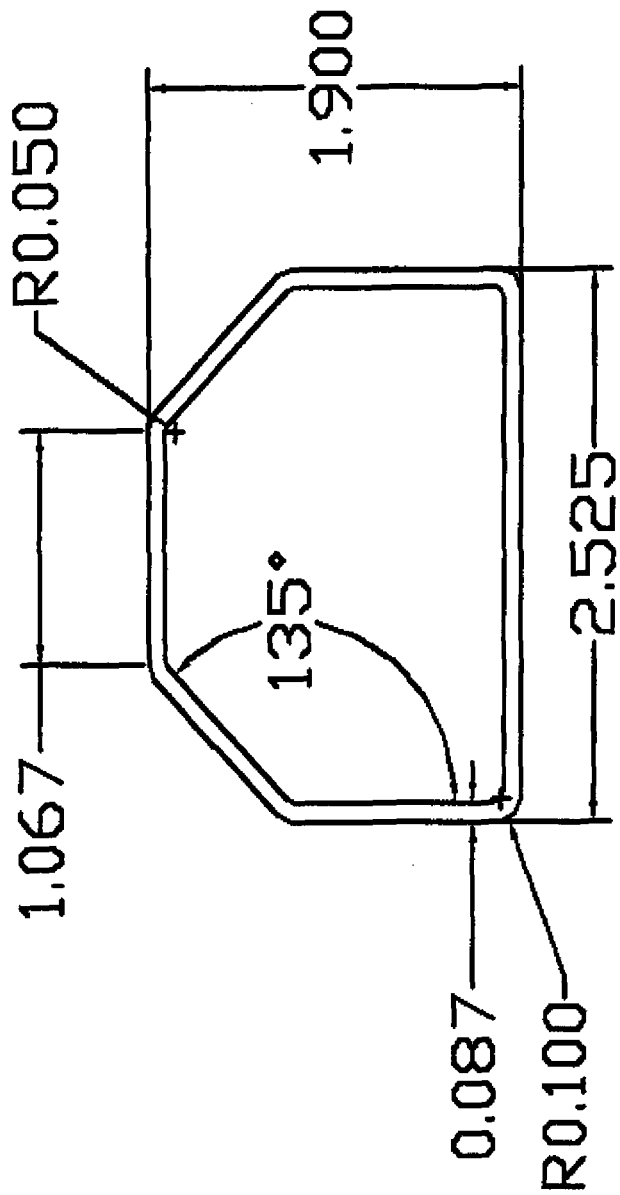
PART C1A - TOP RIGHT & LEFT
14 - FIGURE 28

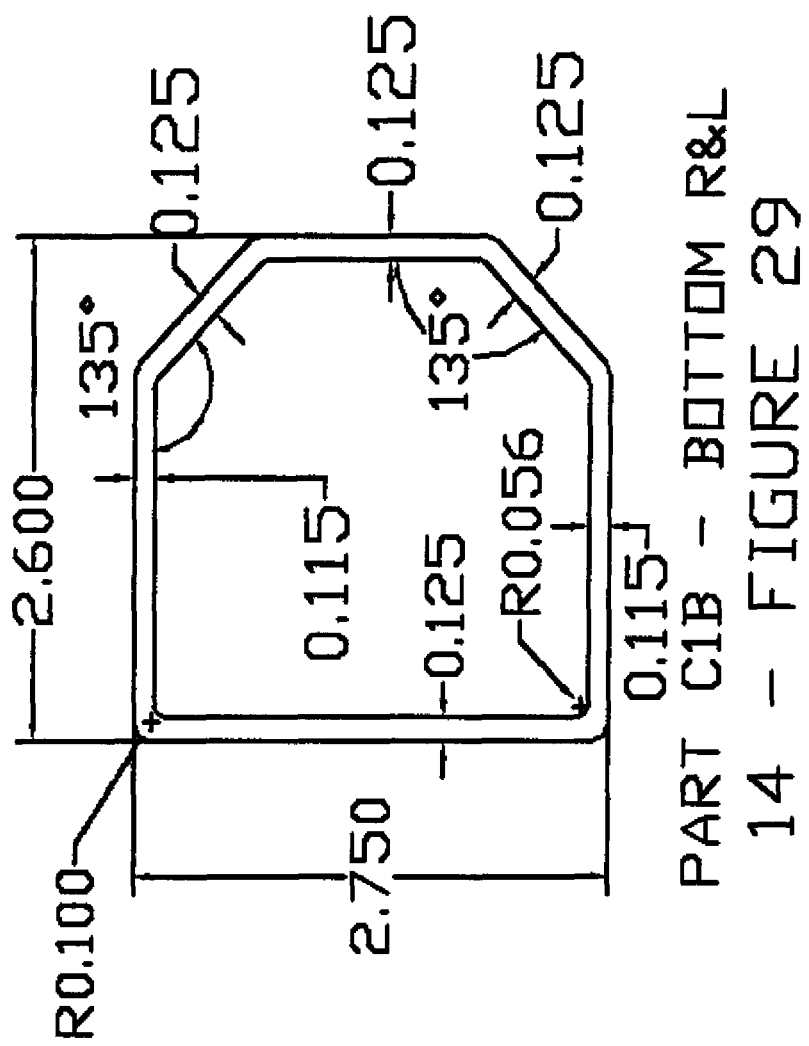

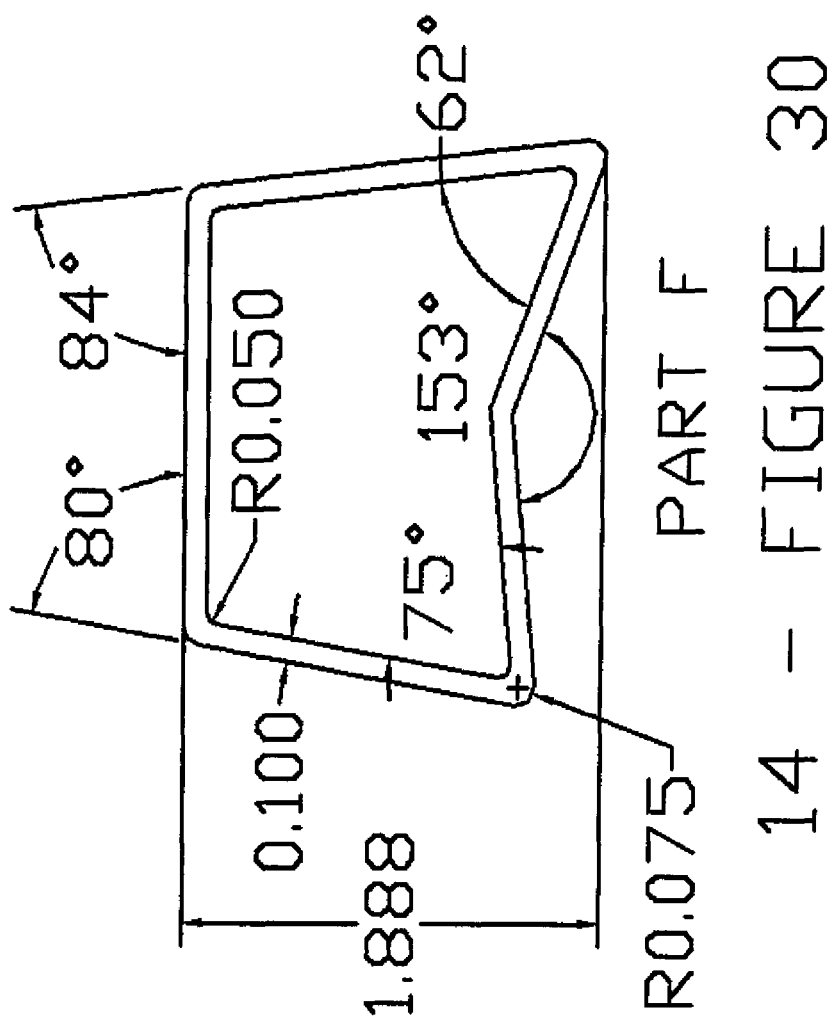
14 – FIGURE 30

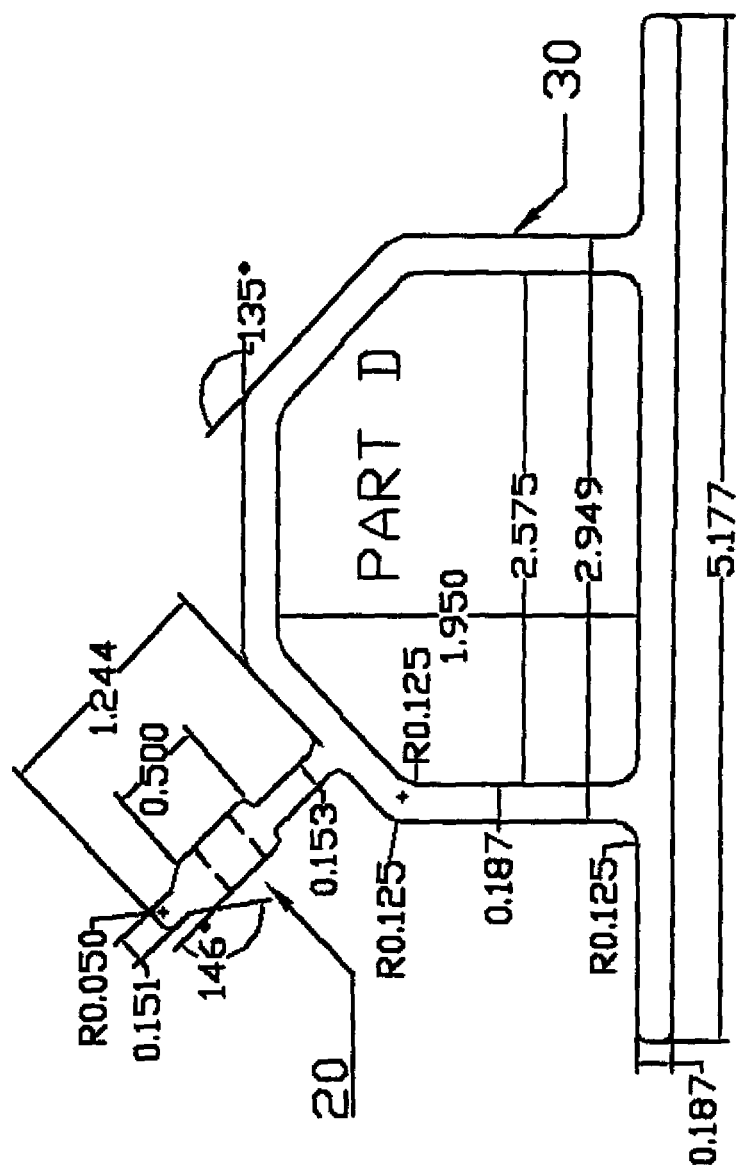

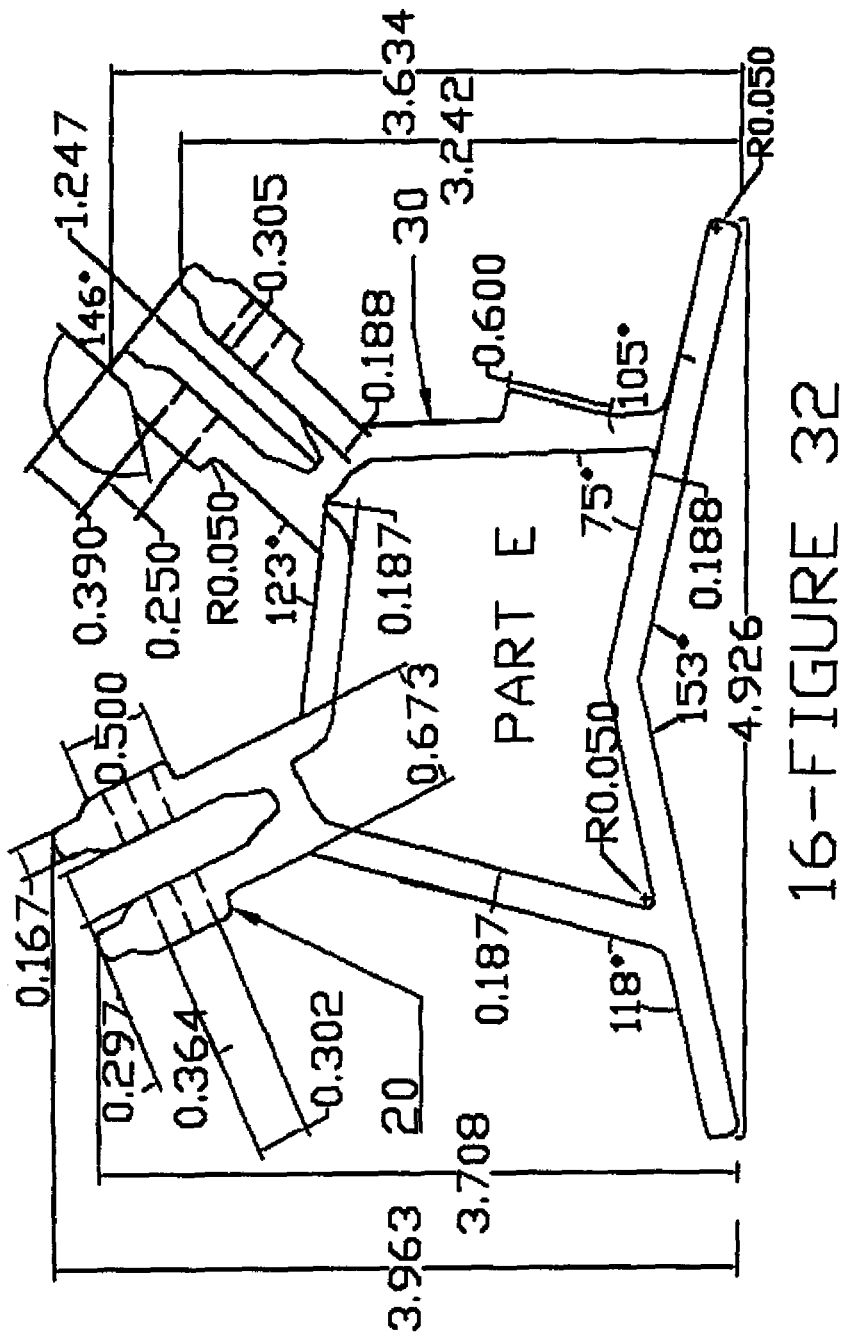

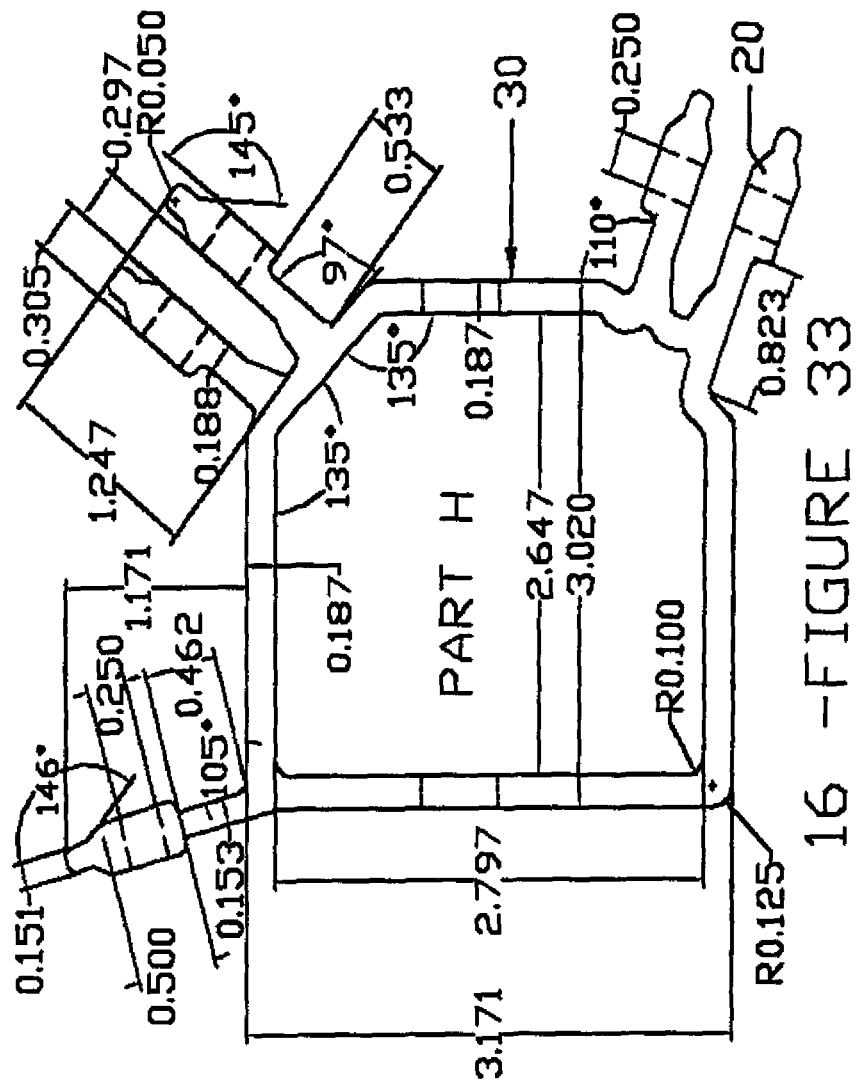
16 – FIGURE 33

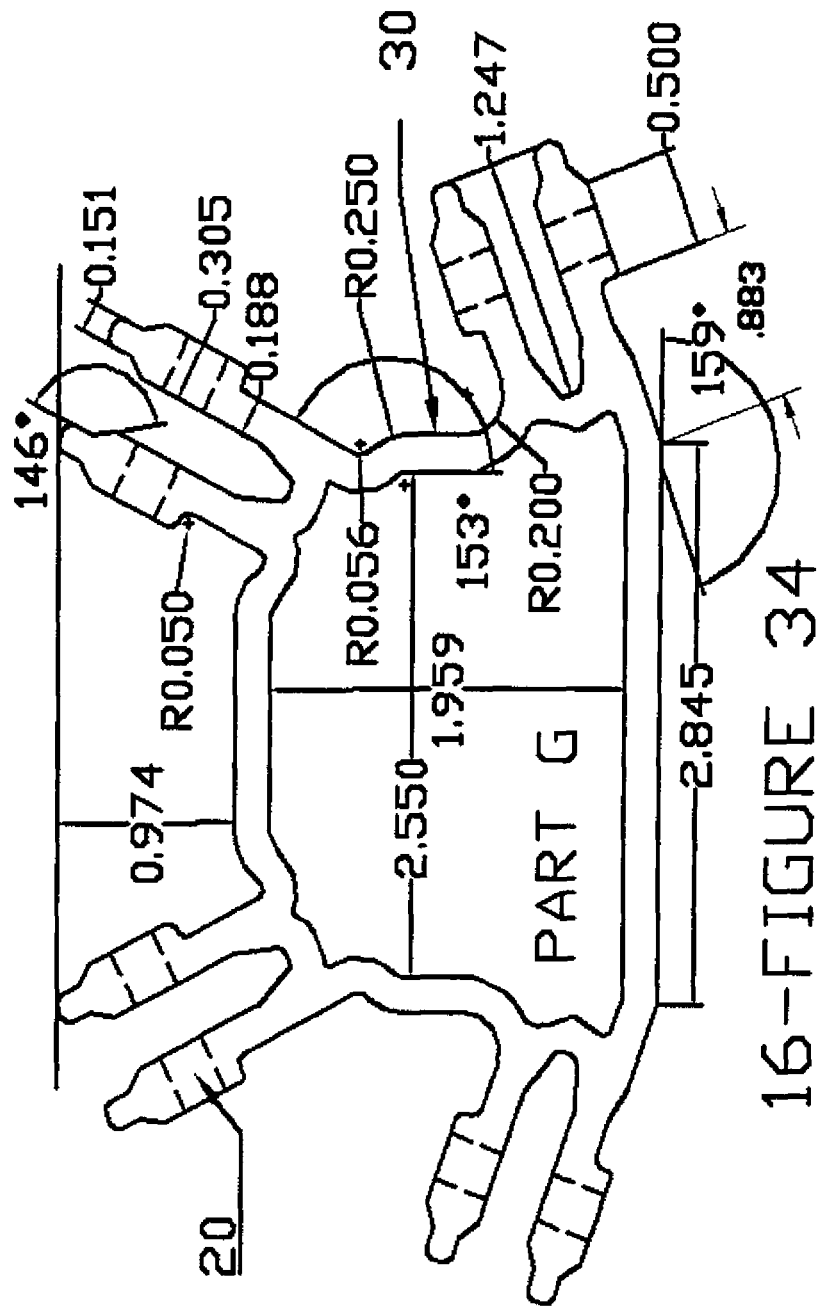

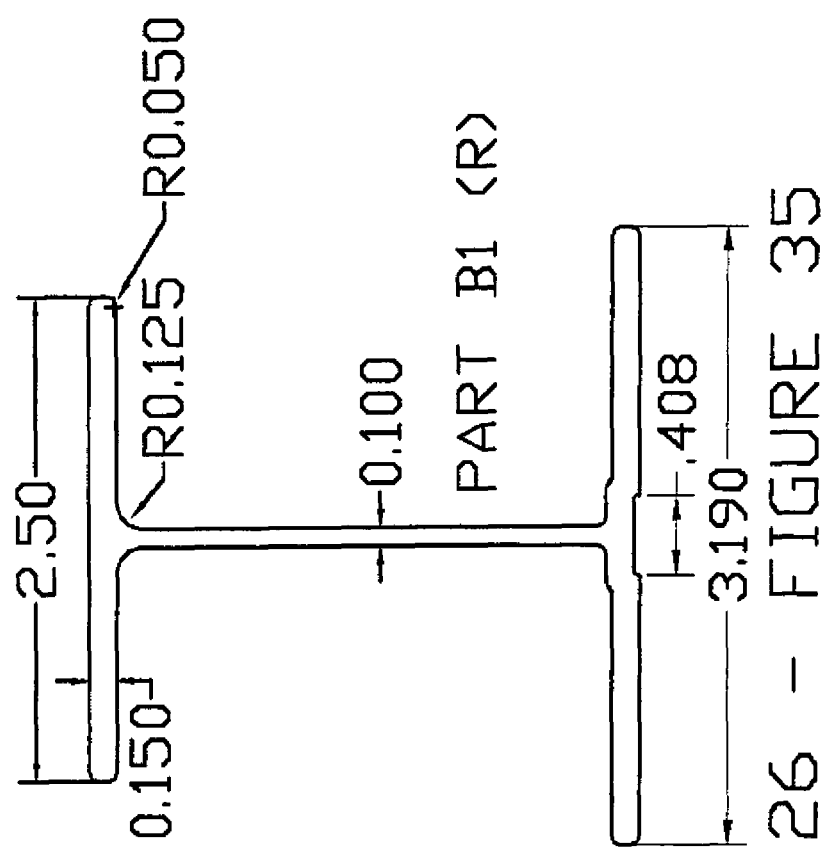
26 – FIGURE 35

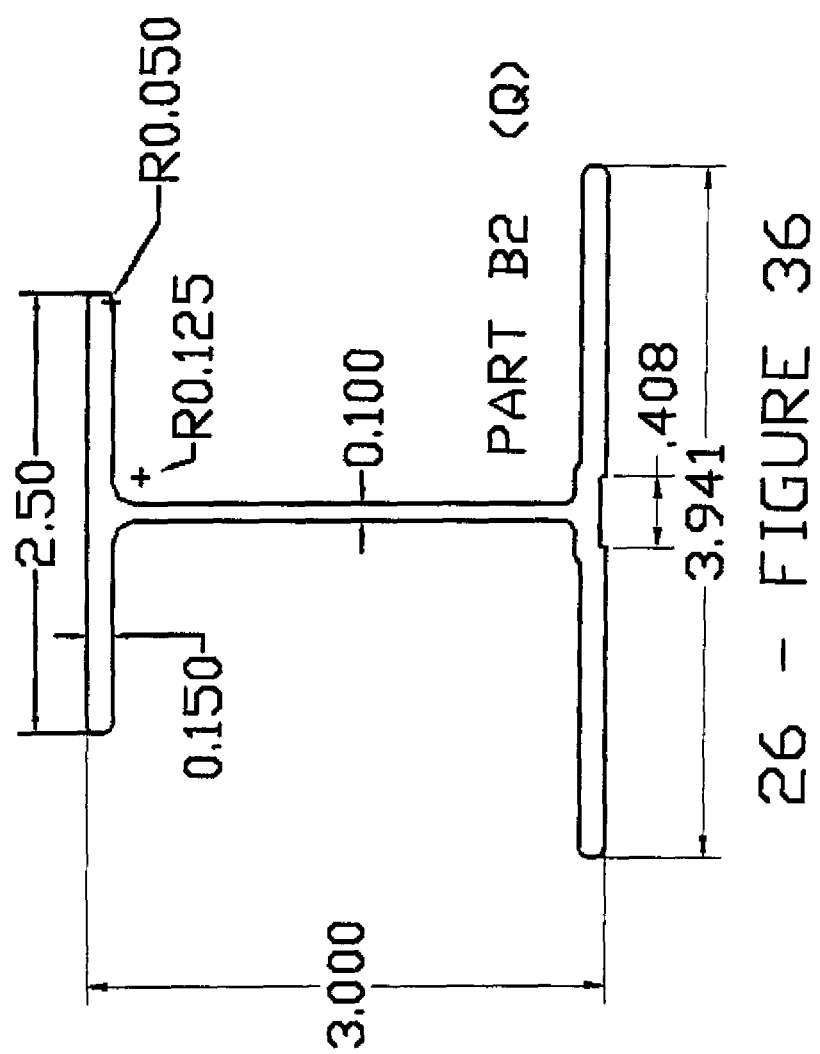
26 – FIGURE 36

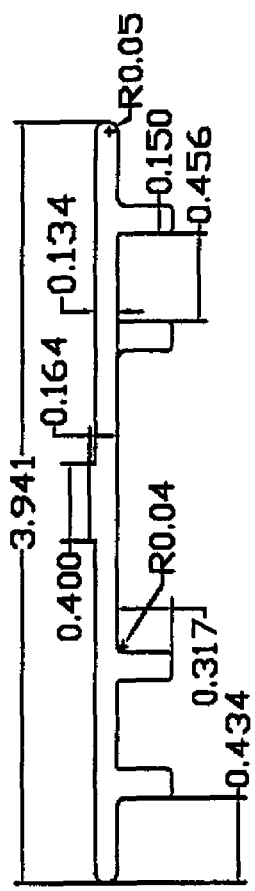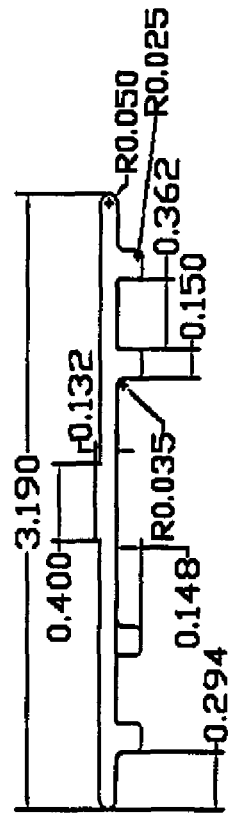

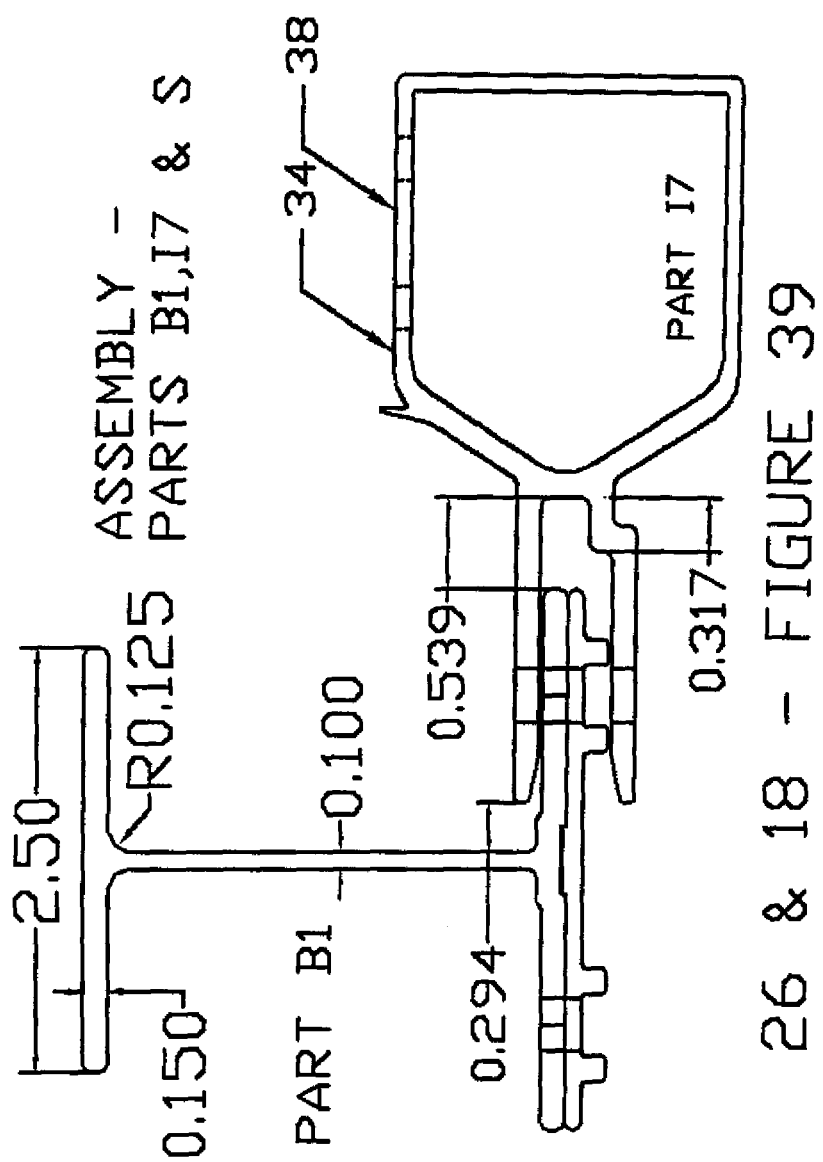

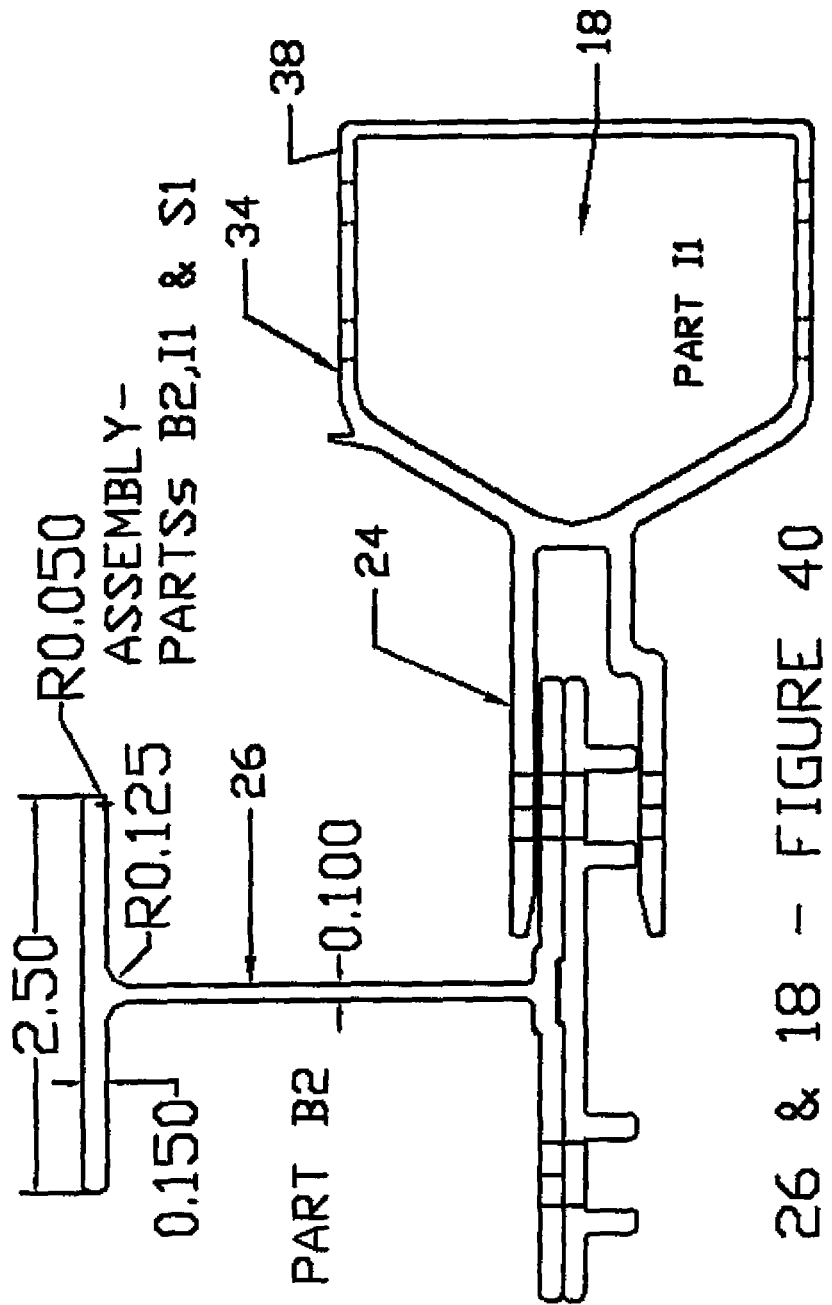

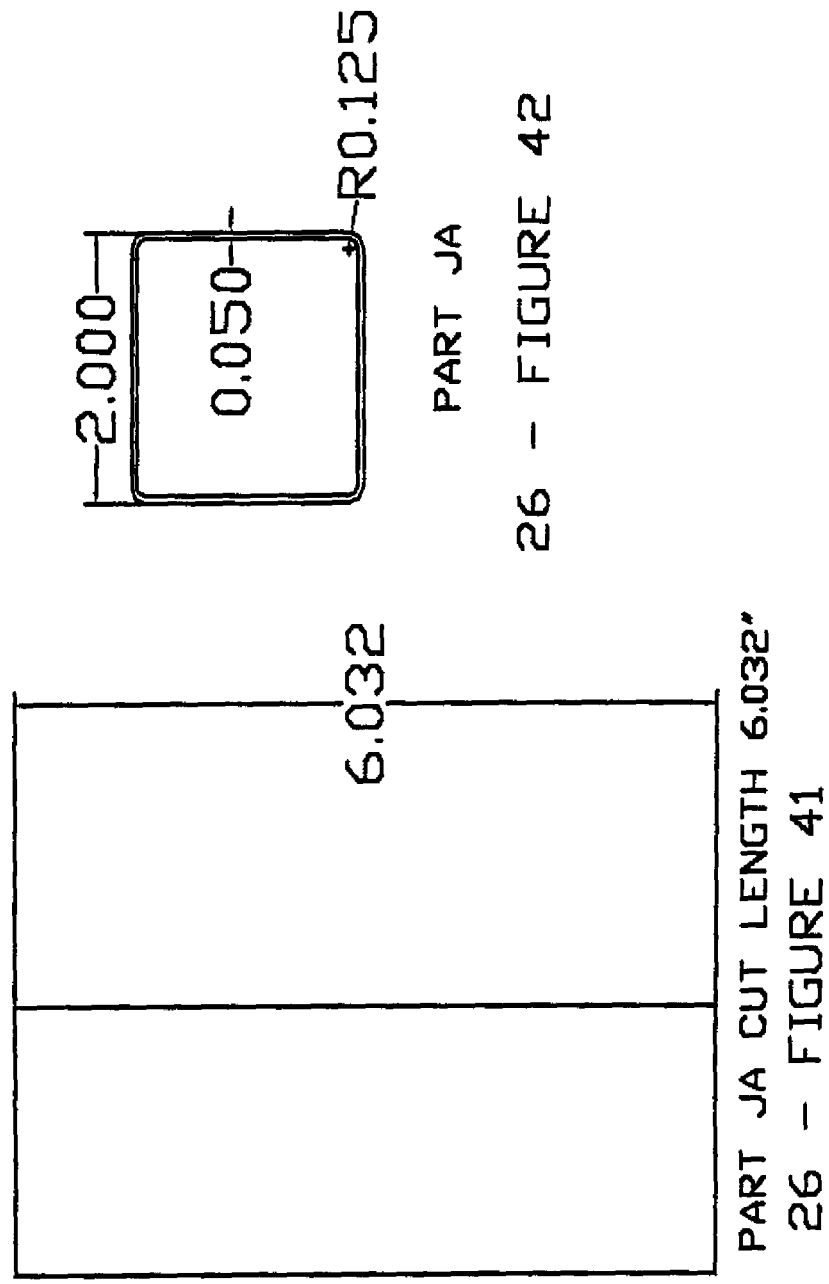

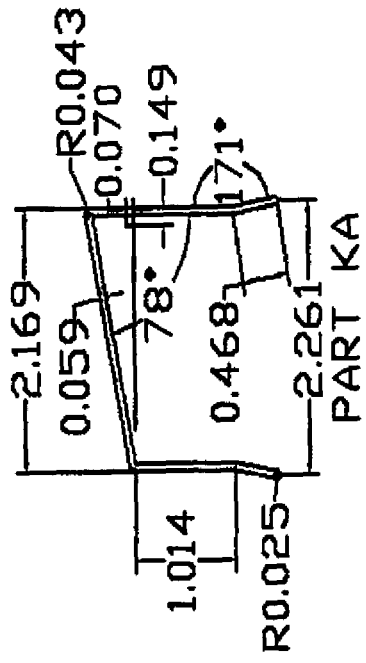
26 - FIGURE 44
PART KA
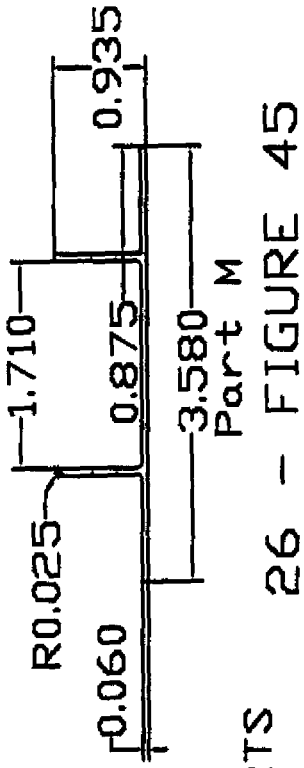
26 - FIGURE 45
Part M
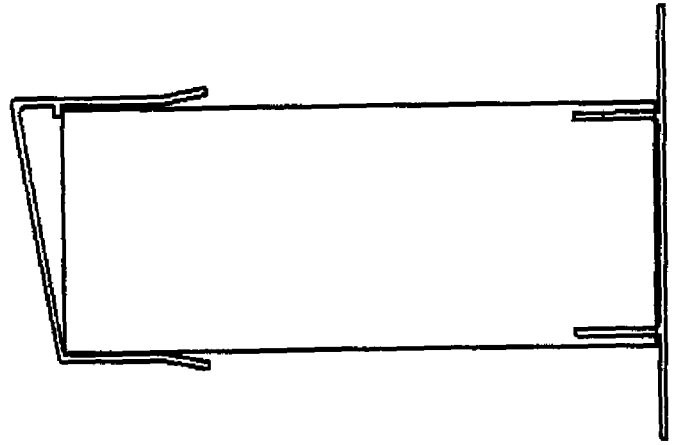
ASSEMBLY OF PARTS
JA, KA, & M
26 - FIGURE 43

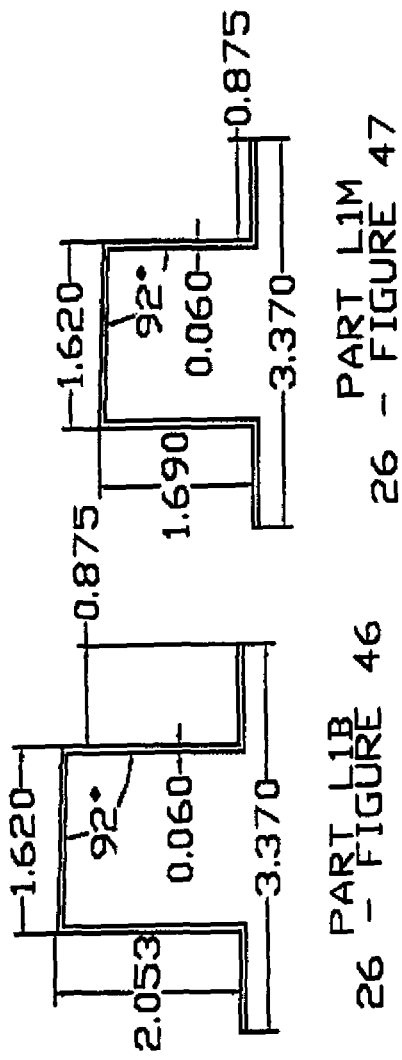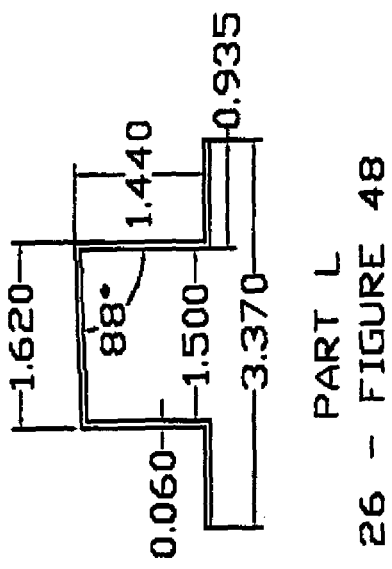

SOLAR TROUGH FRAME, PART AND METHOD

CROSS-REFERENCE TO RELATED APPLICATIONS

This is a continuation of U.S. patent application Ser. No. 12/583,787 filed Aug. 26, 2009, now U.S. Pat. No. 8,887,470, which claims the benefit of U.S. provisional application No. 61/190,573 filed Aug. 29, 2008, all of which are incorporated by reference herein.

FIELD OF THE INVENTION

The present invention pertains to solar frames for holding solar mirrors. (As used herein, references to the "present invention" or "invention" relate to exemplary embodiments and not necessarily to every embodiment encompassed by the appended claims.). More specifically, the present invention pertains to solar frames for holding solar mirrors utilizing a plurality of extruded profiles, including chords, chords sleeves and strut end pieces, where each chord sleeve has at least one chord sleeve fin, and a plurality of struts, where at least one of the struts has a strut end piece having at least one strut end piece fin that connects with a chord sleeve fin.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Concentrating Solar Power (CSP) systems utilize mirrors to concentrate the sun's energy onto points or lines. For the purpose of explanation, we will assume a parabolic trough type system where the parabolic mirrors concentrate the sun's energy onto a fluid filled tube; the hot fluid is then transferred to a more conventional steam turbine power plant or similar system to generate electricity. Reliable support for the large parabolic mirrors is critical to ensure excellent performance (focus) in varying atmospheric conditions and to guard against mirror breakage. Some of the key issues include overall frame deflection from its own weight, that of the attached mirrors and wind loads. Prior art for Solar Trough designs relied on steel fabrications and weldments or aluminum extrusions configured and joined using techniques developed in the building construction industry. We used our experience in building safety critical structures from aluminum extrusions (ladders, staging and scaffolding) and our extensive extrusion industry tooling and operational knowledge and coupled this with the load and performance requirements for solar trough frames; we used structural engineering and Finite Element Analyses (FEA) to design a more optimal solar trough frame—minimum weight, efficient production processes (extrusion, fabrication, subassembly and final assembly) with the end product designed to meet all weight, wind, temperature and torsional loads expected.

BRIEF SUMMARY OF THE INVENTION

The present invention pertains to a solar trough frame for holding solar mirrors. The frame comprises a plurality of chords. The frame comprises a plurality of extruded profiles, including chords, chord sleeves, struts and strut end pieces, each chord sleeve having at least one chord sleeve fin, each chord sleeve positioned about one of the chords. The frame comprises a plurality of struts, at least one of the struts having a strut end piece having at least one strut end piece fin that connects with a chord sleeve fin to connect the plurality of chords. The frame comprises a platform supported by the chords and struts on which the solar mirrors are disposed.

The present invention pertains to a chord sleeve for connecting a chord of a solar frame which supports solar mirrors to a strut end piece extending from a strut of the solar frame. The chord sleeve comprises a chord sleeve primary portion having an opening in which the chord is disposed; and at least one chord sleeve fin extending from the primary portion that is fixed to the strut end piece.

The present invention pertains to a strut end piece for connecting the strut of a solar frame which supports solar mirrors to a chord sleeve of the solar frame. The strut end piece comprises a strut end piece primary portion which attaches to the strut. The strut end piece comprises at least one strut end piece fin extending from the strut end piece primary portion which attaches to the chord sleeve.

The present invention pertains to a method for linking a strut of a solar frame which supports solar mirrors to a chord of the solar frame. The method comprises the steps of positioning a strut end piece fin of a strut end piece of the strut adjacent a chord sleeve fin of a chord sleeve about the chord. There is the step of fixing the strut end piece fin and the chord sleeve fin together with a frame fastener that contacts the strut end piece fin and the chord sleeve fin.

The present invention pertains to a method for supporting solar mirrors. The method comprises the steps of receiving sunlight on the mirrors supported by a solar frame formed of a plurality of extruded profiles including chords, chord sleeves and strut end pieces. Each chord sleeve having at least one chord sleeve fin. Each chord sleeve positioned about one of the chords. The frame has a plurality of struts. At least one strut having a strut end piece having at least one strut end piece fin that connects with a chord sleeve fin to connect the plurality of chords, and a platform supported by the chords and struts on which the solar mirrors are disposed. There is the step of moving the frame relative to the sun.

BRIEF DESCRIPTION OF THE SEVERAL VIEWS OF THE DRAWING

In the accompanying drawings, the preferred embodiment of the invention and preferred methods of practicing the invention are illustrated in which:

FIG. 2 shows the complete parts list and geometry overview of the present invention.

FIG. 15 shows the cross sectional profile of strut U of the solar frame of the present invention.

FIG. 16 shows the cross sectional profile of strut M of the solar frame of the present invention.

FIG. 17 shows the cross sectional profile of strut P of the solar frame of the present invention.

FIG. 18 shows the cross sectional profile of strut O of the solar frame of the present invention.

FIG. 19 shows the cross sectional profile of strut W of the solar frame of the present invention.

FIG. 20 shows the cross sectional profile of strut N of the solar frame of the present invention.

FIG. 21 shows the cross sectional profile of strut end piece I7 of the solar frame of the present invention.

FIG. 22 shows the cross sectional profile of strut end piece I4 of the solar frame of the present invention.

FIG. 23 shows the cross sectional profile of strut end piece I3 of the solar frame of the present invention.

FIG. 24 shows the cross sectional profile of strut end piece I1 of the solar frame of the present invention.

FIG. 25 shows the cross sectional profile of strut end piece I2 of the solar frame of the present invention.

FIG. 26 shows the cross sectional profile of strut end piece I5 of the solar frame of the present invention.

FIG. 27 shows the cross sectional profile of strut end piece I6 of the solar frame of the present invention.

FIG. 28 shows the cross sectional profile of chord C1a of the solar frame of the present invention.

FIG. 29 shows the cross sectional profile of chord C1b of the solar frame of the present invention.

FIG. 30 shows the cross sectional profile of chord F of the solar frame of the present invention.

FIG. 31 shows the cross sectional profile of chord sleeve D of the solar frame of the present invention.

FIG. 32 shows the cross sectional profile of chord sleeve E of the solar frame of the present invention.

FIG. 33 shows the cross sectional profile of chord sleeve H of the solar frame of the present invention.

FIG. 34 shows the cross sectional profile of chord sleeve G of the solar frame of the present invention.

FIG. 35 shows the cross sectional profile of Ibeam B1 of the solar frame of the present invention.

FIG. 36 shows the cross sectional profile of Ibeam B2 of the solar frame of the present invention.

FIG. 37 shows the cross sectional profile of Ibeam spacer S1 of the solar frame of the present invention.

FIG. 38 shows the cross sectional profile of Ibeam spacer S of the solar frame of the present invention.

FIG. 39 shows the assembly drawing of Ibeam B1, strut end piece I7 and spacer S of the solar frame of the present invention.

FIG. 40 shows the assembly drawing of Ibeam B2, strut end piece I1 and spacer S1 of the solar frame of the present invention.

FIG. 41 shows the side view (cut length) of mirror support upright Ja of the solar frame of the present invention.

FIG. 42 shows the cross sectional profile of mirror support upright Ja of the solar frame of the present invention.

FIG. 43 shows the mirror upright assembly of parts Ja, Ka and M of the solar frame of the present invention.

FIG. 44 shows the cross sectional profile of the mirror support rail Ka of the solar frame of the present invention.

FIG. 45 shows the cross sectional profile of the mirror upright assembly base M of the solar frame of the present invention.

FIG. 46 shows the cross sectional profile of the mirror support rail L1b of the solar frame of the present invention.

FIG. 47 shows the cross sectional profile of the mirror support rail L1m of the solar frame of the present invention.

FIG. 48 shows the cross sectional profile of the mirror support rail L of the solar frame of the present invention.

DETAILED DESCRIPTION OF THE INVENTION

Figure 1:
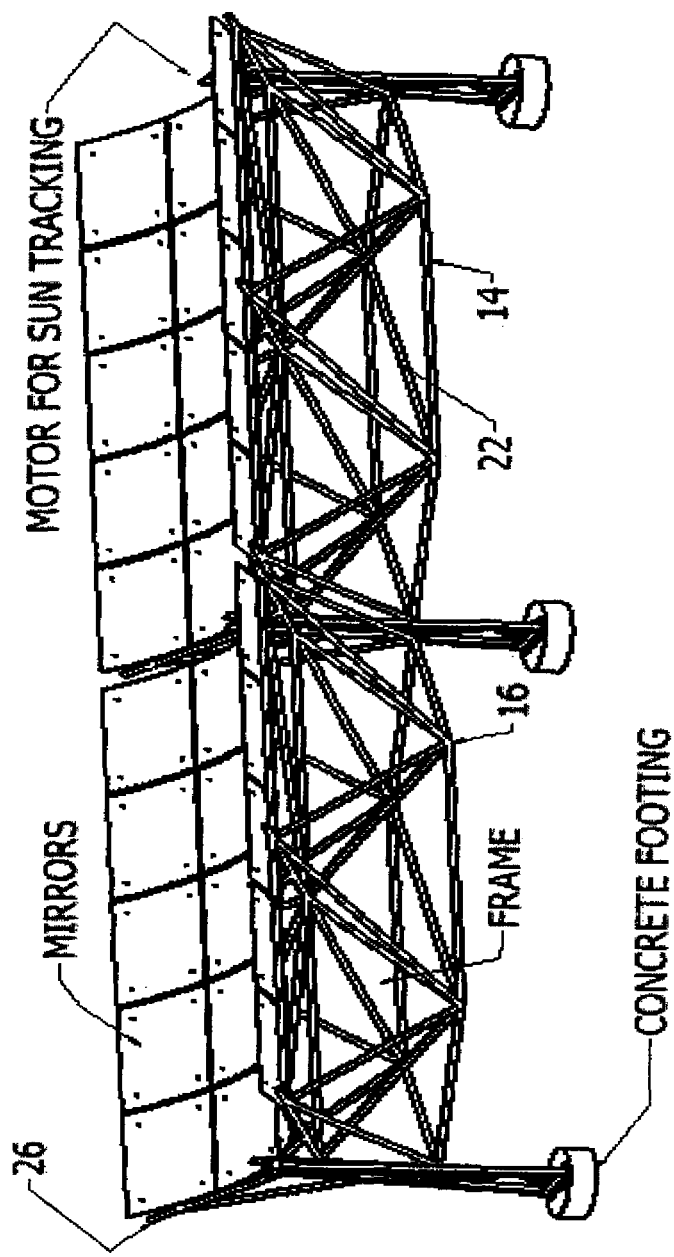
FIG. 1 shows a 3D line drawing of the frame of the present invention.
Figure 3:
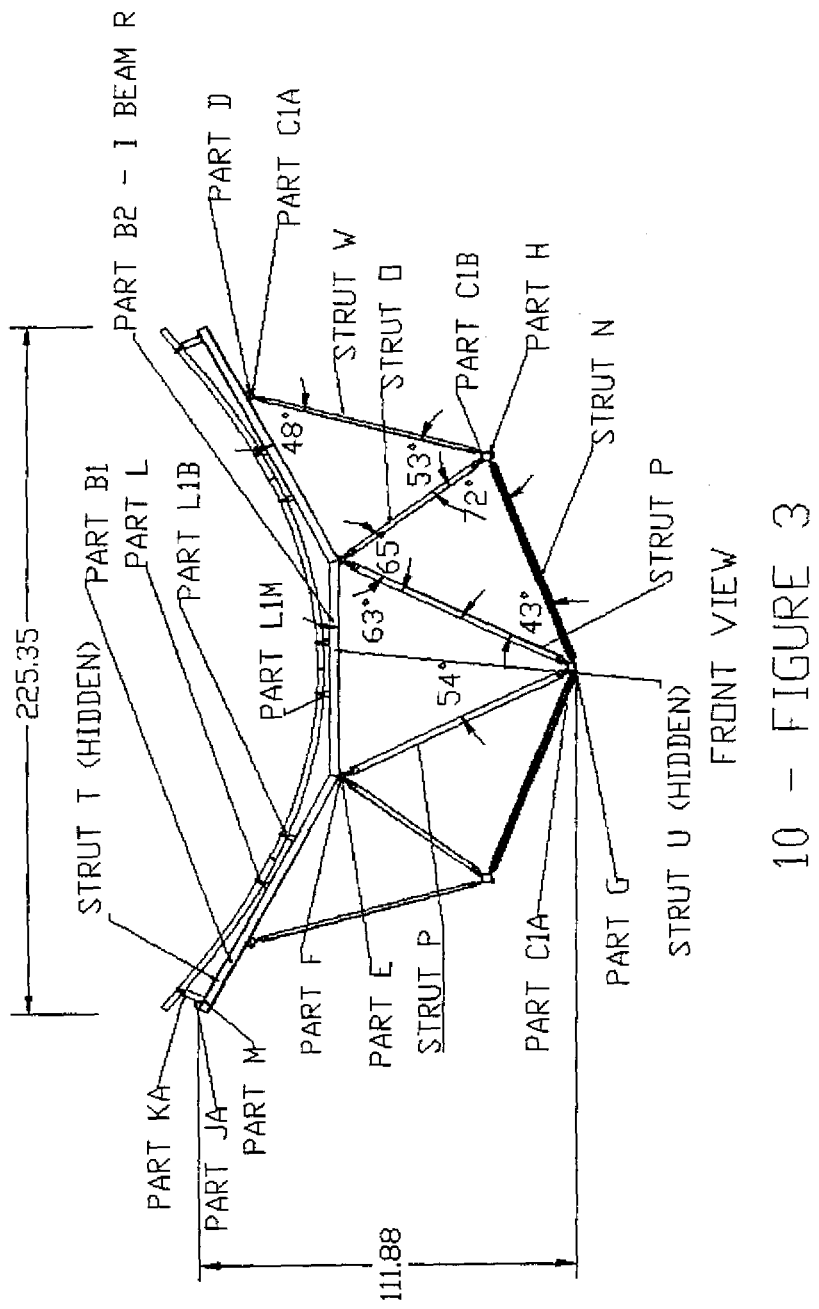
FIG. 3 shows an end view of solar frame of the present invention.
Figure 4:
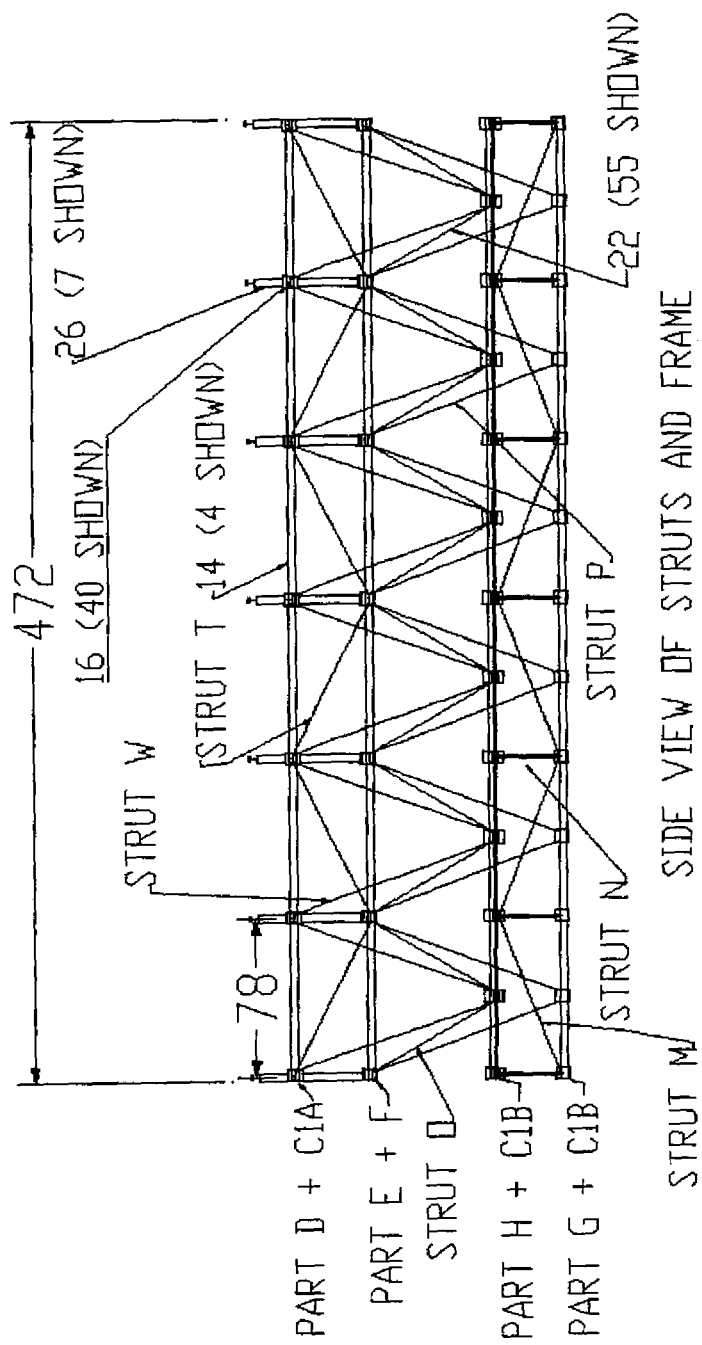
FIG. 4 shows a side view depicting the struts, chords, I-beams and other parts of the solar frame of the present invention.
Figure 5:
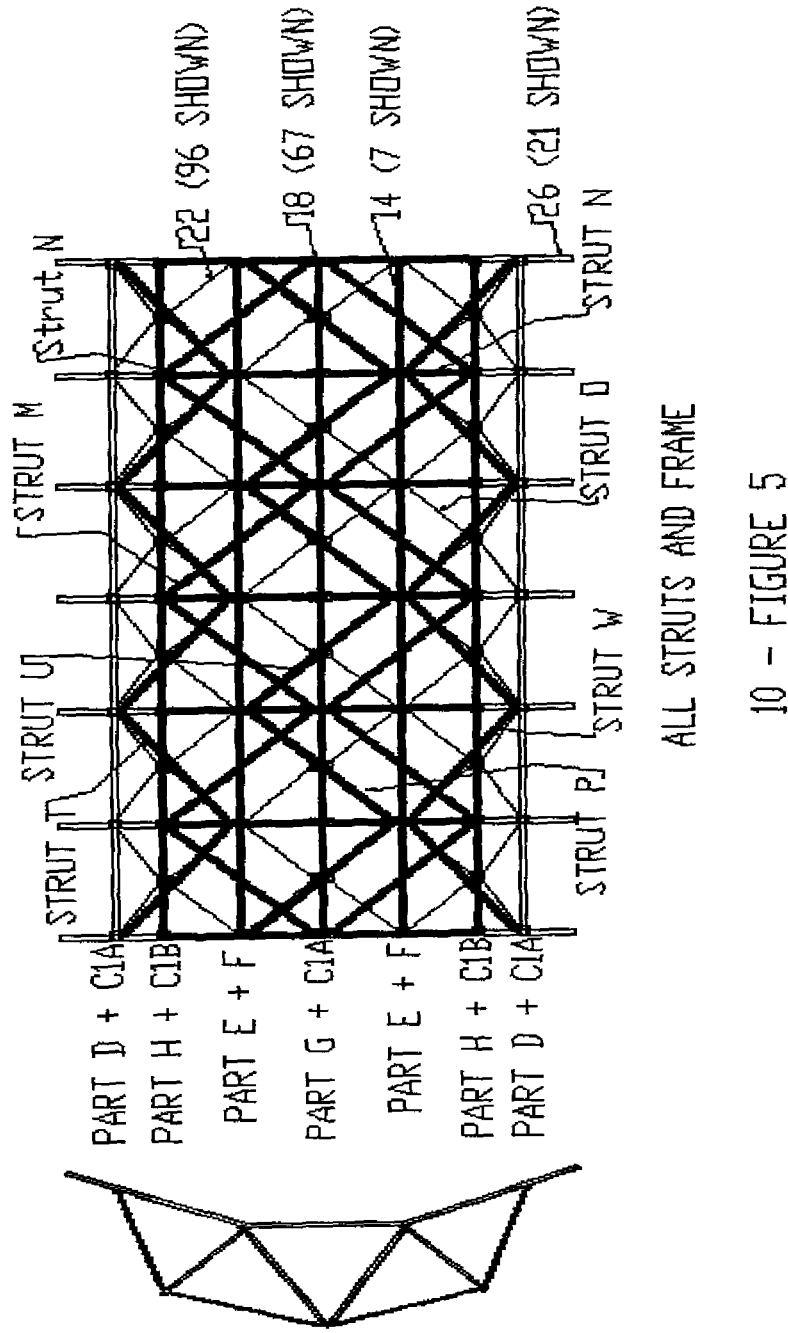
FIG. 5 shows a top view depicting all of the struts, chords, I-beams and other parts of the solar frame of the present invention.
Figure 6:
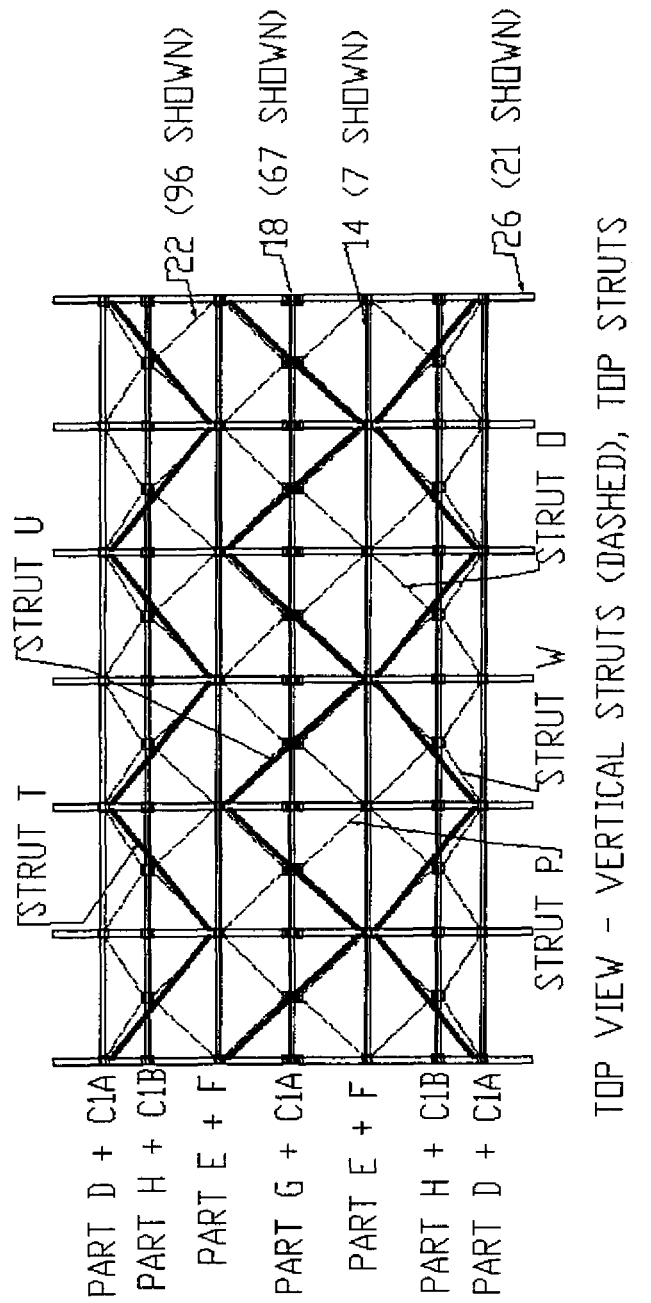
FIG. 6 shows a top view depicting the vertical struts (dashed) and top strut layer between I beams and other parts of the solar frame of the present invention.
Figure 7:
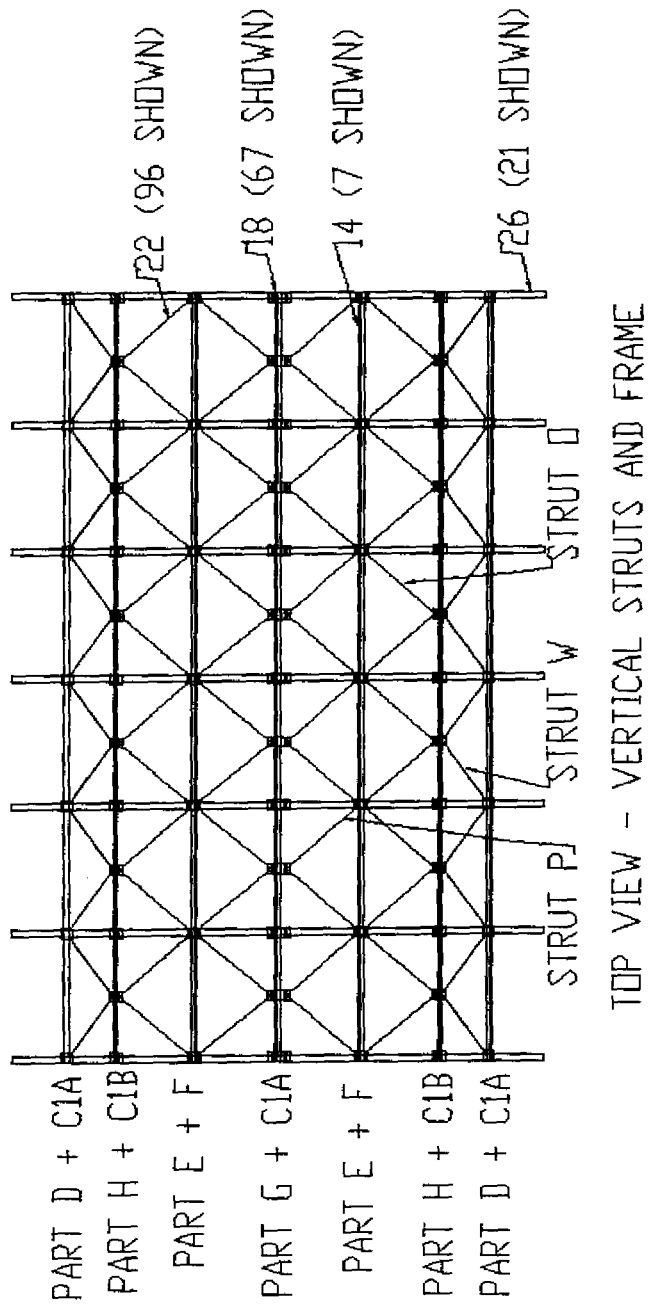
FIG. 7 shows a top view depicting the vertical struts, I beams and other parts of the solar frame of the present invention.
Figure 8:
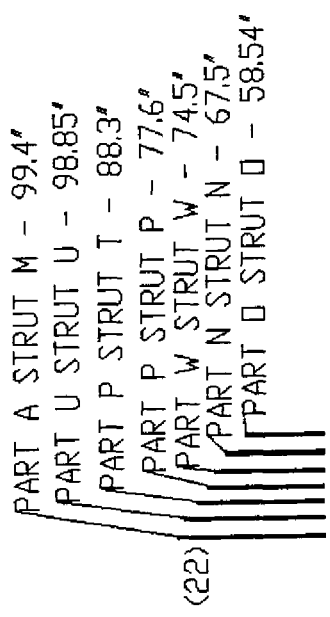
FIG. 8 shows the struts and associated linear lengths and information on the mirrors of the solar frame of the present invention.
Figure 9:
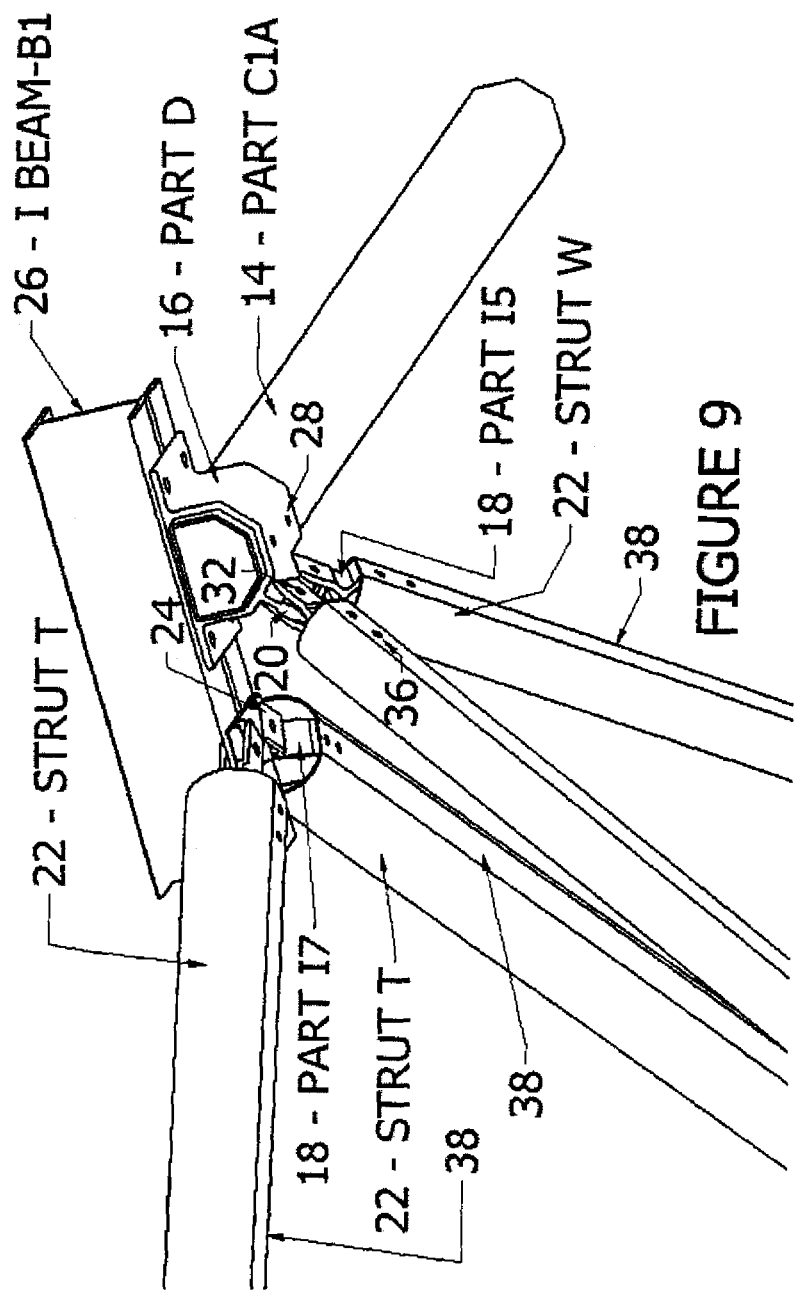
FIG. 9 shows a 3D line drawing of the struts, strut end pieces, chord sleeve, chord and I-beams of the solar fame of the present invention.
Figure 10:
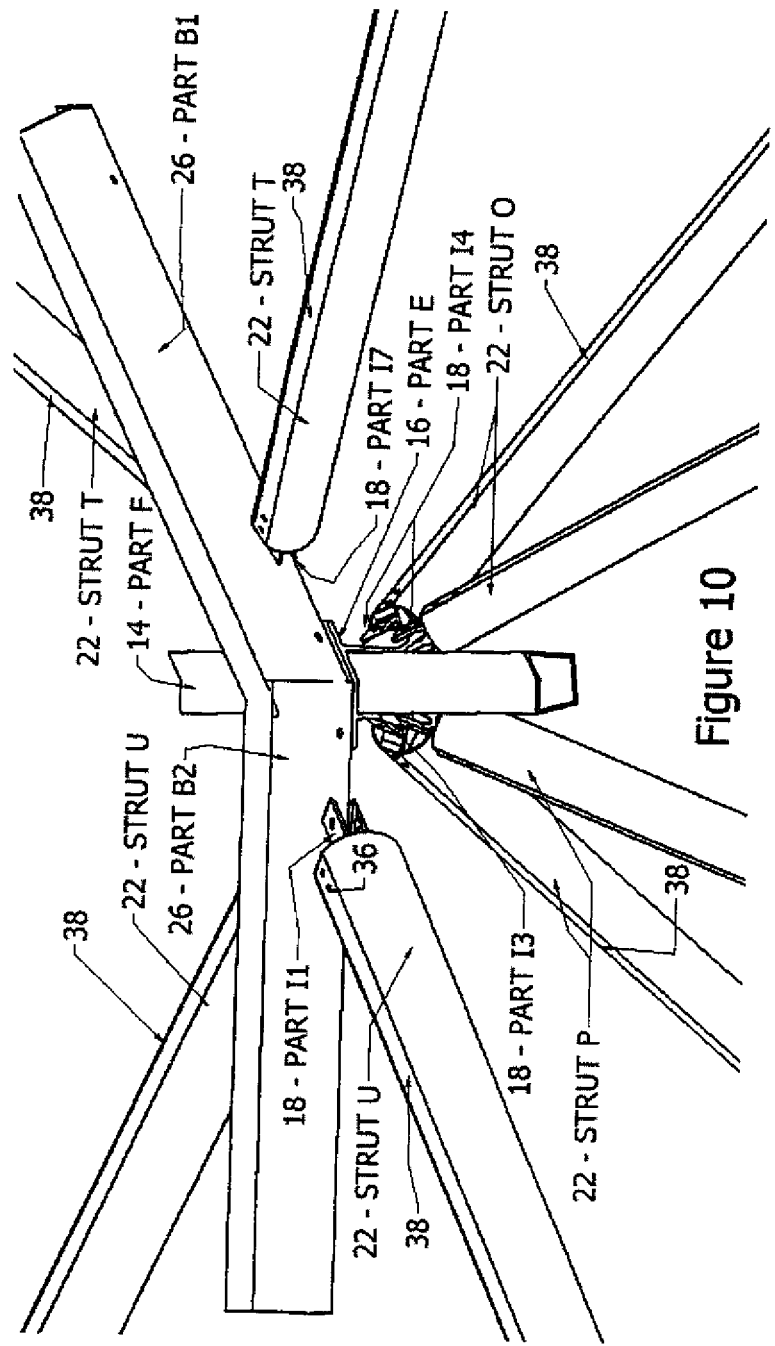
FIG. 10 shows a 3D line drawing of the struts, strut end pieces, chord sleeve, chord and I-beams of the solar fame of the present invention.
Figure 11:
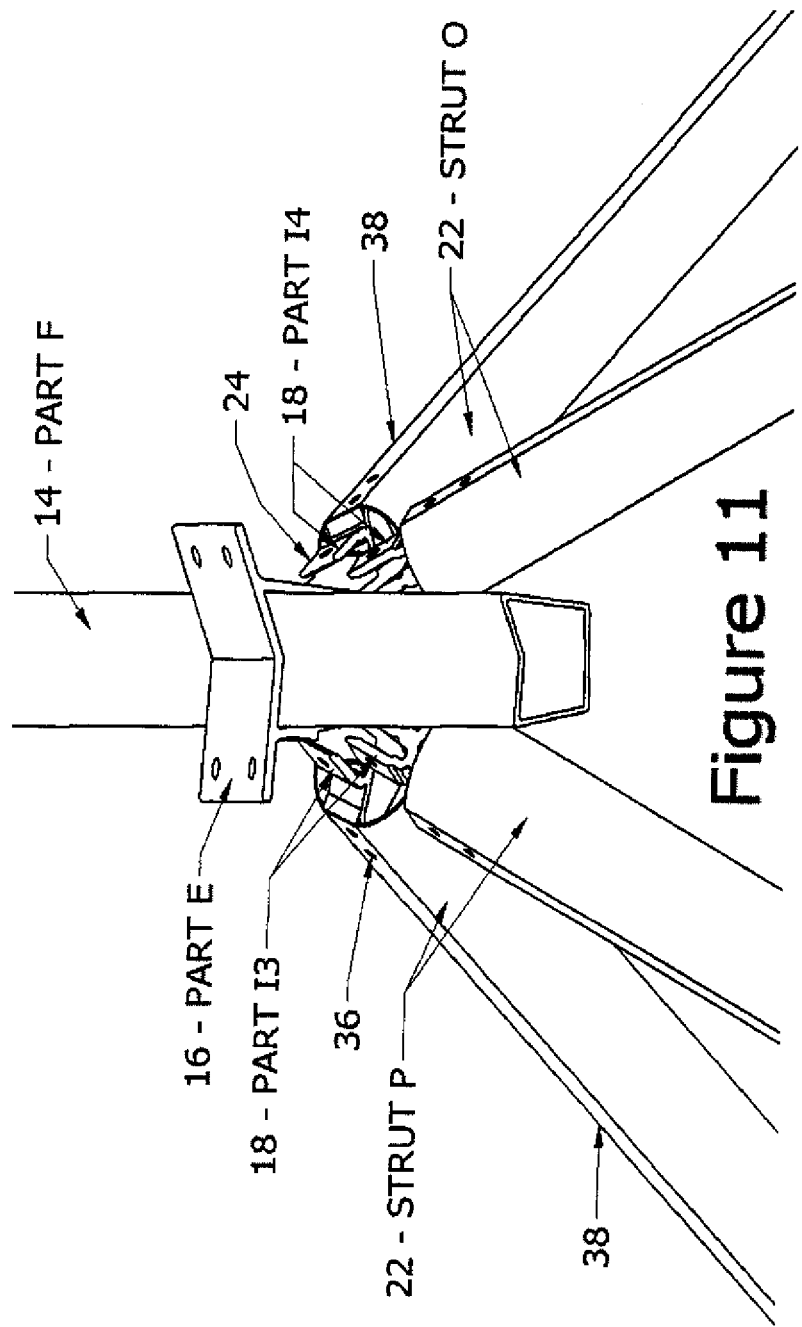
FIG. 11 shows a 3D line drawing of the struts, strut end pieces, chord sleeve and chord that would attach to the I-beams of the solar fame of the present invention.
Figure 12:
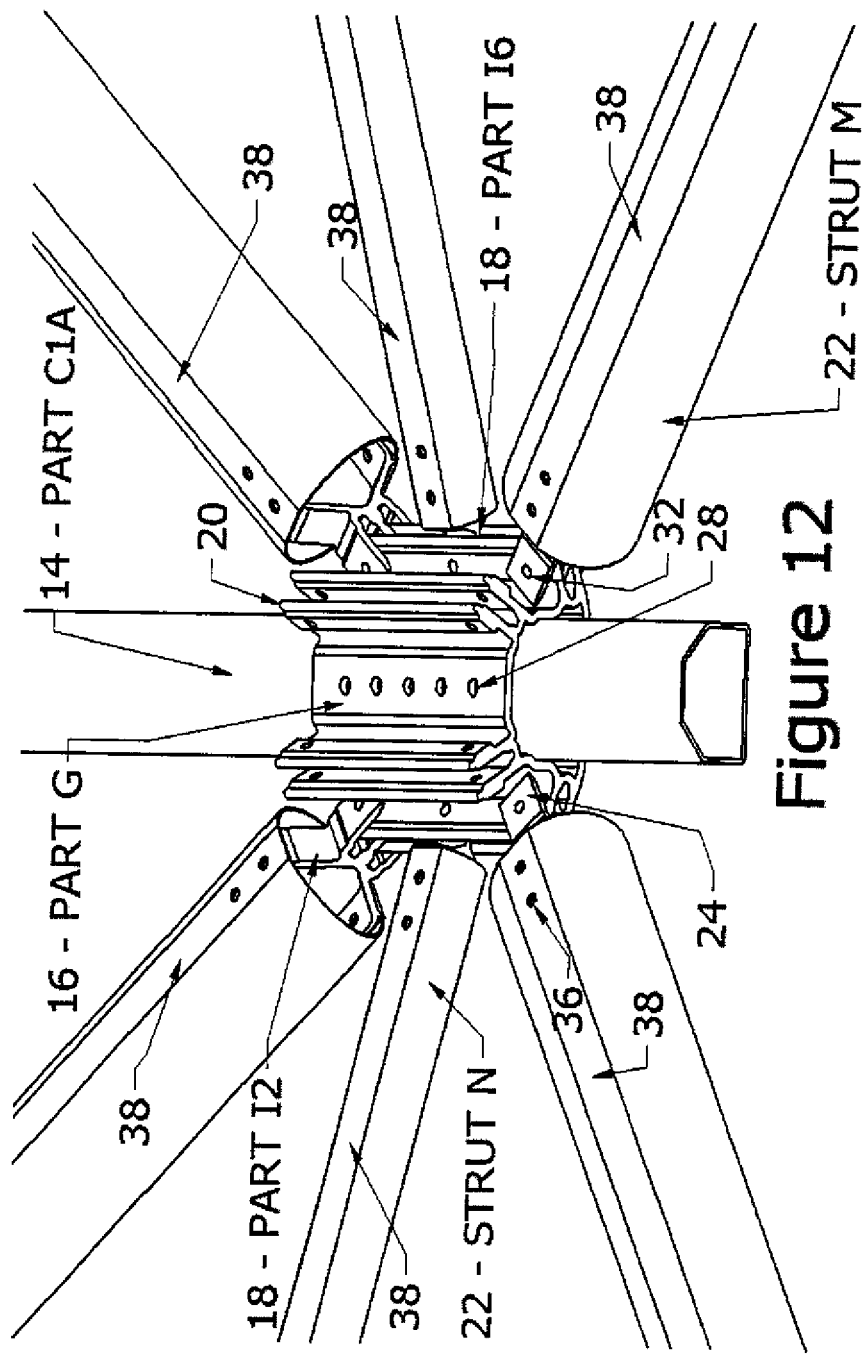
FIG. 12 shows a 3D line drawing of the struts, strut end pieces, chord sleeve and chord at the bottom center of the solar fame of the present invention.
Figure 13:
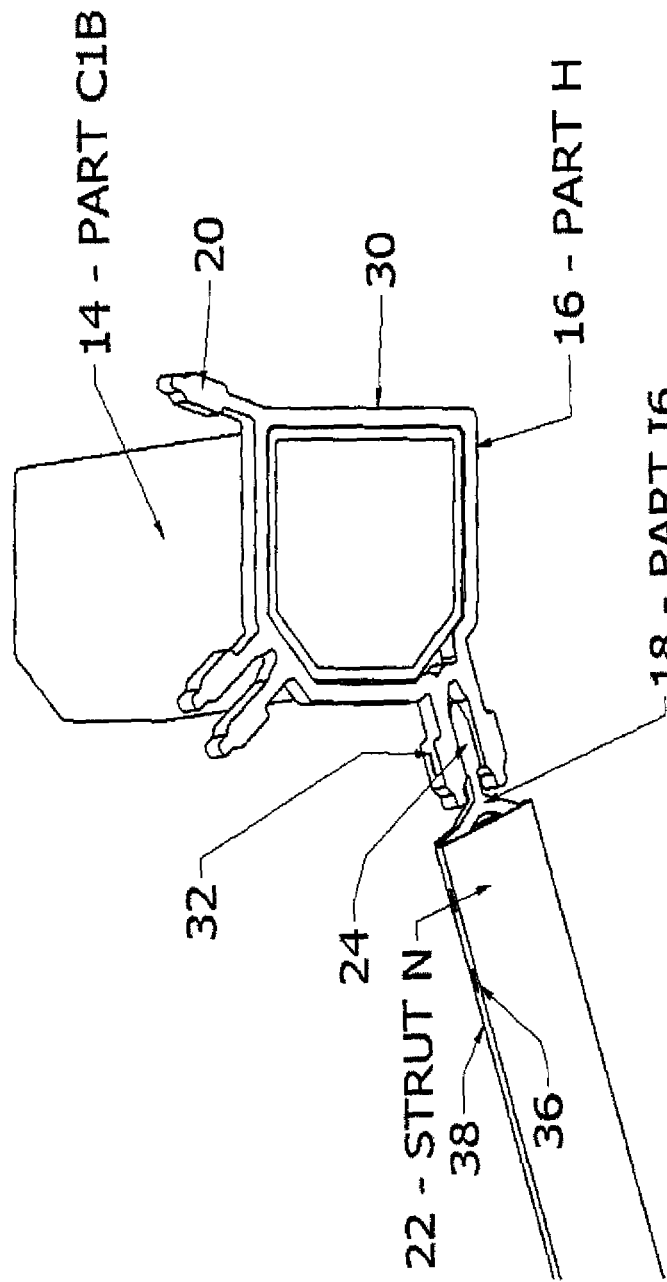
FIG. 13 shows a 3D line drawing of a strut, strut end piece, chord sleeve and chord at the bottom right of the solar fame of the present invention.
Figure 14:
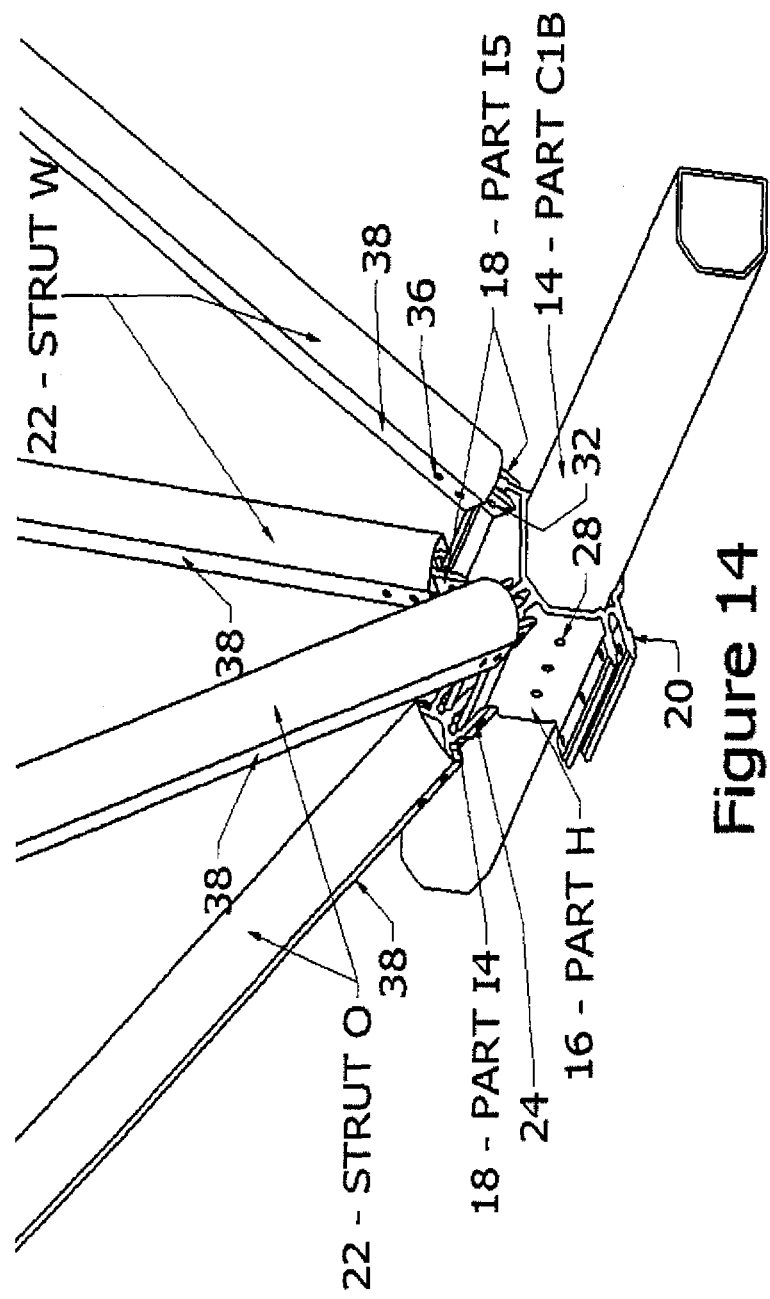
FIG. 14 shows a 3D line drawing of the struts, strut end pieces, chord sleeve and chord at the bottom right of the solar fame of the present invention.

Referring now to the drawings wherein like reference numerals refer to similar or identical parts throughout the several views, and more specifically to FIGS. 1-48 thereof, there is shown a solar trough frame 10 for holding solar mirrors 12 (overview best seen in FIGS. 1, 2 and 3). The frame 10 comprises a plurality of chords 14. The frame 10 comprises a plurality of extruded profiles, including chord sleeves 16, struts 22 and strut end pieces 18, each chord sleeve 16 having at least one chord sleeve fin 20, each chord sleeve 16 positioned about one of the chords 14. The frame 10 comprises a plurality of struts 22, at least one of the struts 22 having a strut end piece 18 having at least one strut end piece fin 24 that connects with a chord sleeve fin 20 to connect the plurality of chords 14. The frame 10 comprises a platform 26 supported by the chords 14 and struts 22 on which the solar mirrors 12 are disposed.

At least one chord sleeve 16 and strut end piece 18 may have a circle size which fits within a 7 inch diameter extrusion press. The strut end piece fins 24 may interface with the chord sleeve fins 20 so that loads converge on a common central point. At least one strut 22 may intersect with at least one chord 14 in a non-perpendicular fashion. The chord sleeve fin 20 and the strut end piece fin 24 may be thicker at a location through which the frame 10 fastener extends than at the fin's tip. Each chord sleeve 16 and strut end piece 18 may have a profile circumscribing circle size less than what would be possible without the strut end piece 18. Each chord sleeve 16 and strut end piece 18 may be made of aluminum.

The present invention pertains to a chord sleeve 16 for connecting a chord 14 of a solar frame 10 which supports solar mirrors 12 to a strut end piece 18 extending from a strut 22 of the solar frame 10. The chord sleeve 16 comprises a chord sleeve primary portion 30 having an opening in which the chord 14 is disposed; and at least one chord sleeve fin 20 extending from the primary portion that is fixed to the strut end piece 18.

The chord sleeve 16 may include a chord sleeve fastener 28 which fixes the chord sleeve primary portion 30 to the chord 14, and a frame fastener 32 which fixes the chord sleeve fin 20 to the strut end piece 18. The chord sleeve primary portion 30 may be a chord sleeve main profile and the chord sleeve fin 20 is a chord sleeve boss extending from the chord sleeve main profile. The chord sleeve main profile and the chord sleeve boss may be made of aluminum.

The present invention pertains to a strut end piece 18 for connecting the strut 22 of a solar frame 10 to a chord sleeve 16 which in turn support a Platform 26 which support solar mirrors of the solar frame 10. The strut end piece 18 comprises a strut end piece primary portion 34 which attaches to the strut 22. The strut end piece 18 comprises at least one strut end piece fin 24 extending from the strut end piece primary portion 34 which attaches to the chord sleeve 16.

The piece may include at least one strut end piece fastener 36 which fixes the strut end piece primary portion 34 to the strut 22, and a frame fastener 32 which fixes the strut end piece fin 24 to the chord sleeve fin 20.

The strut end piece primary portion 34 may be a strut end piece main profile and the strut end piece fin 24 is a strut end piece boss extending from the strut end piece main profile. The strut main profile and the strut boss may be made of aluminum. The strut end piece primary portion 34 may have an essentially flat side 38 to align with an essentially flat side 38 of the strut 22. The strut fin may have a tongue ratio of less than or equal to 3.

The present invention pertains to a method for linking a strut 22 of a solar frame 10 which supports solar mirrors 12 to a chord 14 of the solar frame 10. The method comprises the steps of positioning a strut end piece fin 24 of a strut end piece 18 of the strut 22 adjacent a chord sleeve fin 20 of a chord sleeve 16 about the chord 14. There is the step of fixing the strut end piece fin 24 and the chord sleeve fin 20 together with a frame fastener 32 that contacts the strut end piece fin 24 and the chord sleeve fin 20.

There may be the step of attaching the strut end piece 18 to the strut 22. There may be the step of attaching the chord sleeve 16 to the chord 14. The step of attaching the strut end piece 18 to the strut 22 may include the step of fixing the strut end piece 18 and the strut 22 together with a strut end piece fastener 36 that contacts the strut end piece 18 and the strut 22. The attaching the chord sleeve 16 to the chord 14 step may include the step of fixing the chord sleeve 16 and the chord 14 together with a chord sleeve fastener 28 that contacts the chord sleeve 16 and the chord 14.

The present invention pertains to a method for supporting solar mirrors 12. The method comprises the steps of receiving sunlight on the mirrors 12 supported by a solar frame 10 formed of a plurality of extruded profiles including chords 14, chord sleeves 16, struts 22 and strut end pieces 18. Each chord sleeve 16 having at least one chord sleeve fin 20. Each chord sleeve 16 positioned about one of the chords 14. The frame 10 has a plurality of struts 22. Each strut 22 having a strut end piece 18 having at least one strut fin that connects with a chord sleeve fin 20 to connect the plurality of chords 14, and a platform 26 supported by the chords 14 and struts 22 on which the solar mirrors 12 are disposed. There is the step of moving the frame 10 relative to the sun.

Implementing the design features, as detailed below will lead to globally optimizing frame 10 extrusion, fabrication, transportation, and site assembly while meeting all technical, structural, and ongoing maintenance requirements. The frame 10 of the present invention makes efficient use of the extruded metal to optimize the weight and construction costs of the frame 10 while exceeding the strength and deflection requirements; some of the unique connection features allow more efficient use of material and accurate part connection locations.

The preferred embodiment can best be described as a 12 meter long framework designed to support four rows of parabolic mirrors 12, each of which is comprised of seven mirrors 12 in the row. The design concepts are applicable to other configurations of length or combination of mirrors 12; the specific iteration was for the 12 meter frame 10 supporting 28 parabolic mirrors 12; the design concepts are also applicable to different geometric arrangements of the chords, chord sleeves, struts, strut end pieces, mirror supports, mirrors and other components. Specific member profiles can vary (simple tubes, D-shapes, etc. . . . ) as design modifications dictate.

Solar trough frames are generally designed so that the outermost frames in the field are strongest, as they are buffeted by winds to a higher degree while the internal frames are somewhat shielded from the strongest winds. The design described is for the outermost frames, although the same design philosophies and analyses techniques/iterations will yield optimal designs for the innermost (lighter) frames as well.

Referring to FIGS. 1-48, the main components of the structure are the following:
- Mirror support structures (Platform) (FIGS. 1-7, 9,10, 35-48) Five different designs—two comprised of capped structural tubes (FIG. 43) and three as hollow trapezoids with attachment legs (FIGS. 46-48), with the capped structural designs spanning higher I-beam to mirror heights and the trapezoids lower heights; each is designed to minimize weight while carrying the required structural loads; the mirror weight and wind loads are transferred efficiently in an axial manner along the taller tubes.
- Modified I-beams (FIGS. 1-7,9,10,35-40)
- One central and two side beams each in seven locations. Depending on the location and position in the frame 10, the I-beams may have different dimensions/thicknesses. In general, the modified I-beams use a wider base and a narrower top.
- Chords/Longitudinal Members (FIGS. 1-7, 9-14 and 28-34)
- One central bottom, two bottom sides, two top sides and two top centers. These three types of chords differ in design due to the differing geometries and tensile or compressive load requirements.
- To use a basic "D-shape" (FIGS. 9, 12, 13, 14, 28 & 29) with overall dimensions and wall thicknesses designed to minimize weight while carrying all required loads as defined by structural engineering analysis and FEA. The two bottom sides are the most highly loaded, followed by the two top sides and then by the one central bottom (depending on tooling cost, this may be designed the same as the two top sides, although as a separate design over 2 lbs/frame weight savings is possible).
- The two top center chords are also designed to meet the geometry, structural engineering analysis and FEA requirements. They look more like "slightly collapsed trapezoids" (FIGS. 10, 11 and 30) and are designed in this manner to meet the I-beam angularity requirements.

Struts (FIGS. 1-27)
Various strut designs (currently six: FIGS. 15-20) as modified circular/flat extrusions with diameter, wall thickness and other descriptors dependant on strut length and both tensile and compressive load requirements.

Strut end piece (FIGS. 2, 3, 9-27, 31-40,)
Strut end pieces are designed to be fabricated and fastened to the struts in a factory setting; the strut end piece can then be connected to the chord sleeves in the field during frame assembly.

Chord Sleeves (FIGS. 1-7, 9-14, 28-40)
Four different designs—one for the bottom center, one for the bottom sides, one for the top sides and one for the top centers. Each is designed to connect the Chords, I-beams and struts with the correct geometry and connection means.

Fasteners (FIGS. 9-14, 31-40)
Various types of fasteners, including "pop rivets" interference pins, bolts, solid compression rivets or other types of fasteners to connect the Chords, Chord Sleeves, Struts, Strut End Pieces, I-beams, and Mirror support structures.

Overview of the structure:
End View: (FIGS. 2, 3, 5)
When viewed from the end view of the structure, the parabolic shape of the four rows of mirrors 12 is evident, as are the three main I-beam supports which the mirrors 12 are connected to via mirror support structure extrusions fabricated and assembled into the structure required. The I-beams are in turn supported by a series of struts. From the end-view the eight struts and the three I-beams make up a central triangular portion flanked on either side by a second set of symmetrical triangles which in turn are flanked on the far right and left by another, different, set of symmetrical triangles. These triangles could be asymmetrical (further optimizing the material content of the frames and performance) if planned installation locations have a consistent wind direction bias.

Side/Top Views: (FIGS. 1, 2, 4-7)
When viewed from the side view or from the top, the myriad interconnections between the various Chords, Chord Sleeves, Struts, Strut End Pieces and I-Beams is evident. It also becomes evident that the length of each connecting strut depends on its 3-dimensional setup—they are generally angled in all of the end, side and top views. It is also evident that the design philosophy used was to create triangular elements in each orientation to ensure that the structure is stable and strong. Triangles are a very efficient way to design structures.

The angles of the struts to each other and to the I-beams and Chords leads to the length of the struts; the structural analysis and FEA work show both the tensile and compressive forces given various loading conditions (position, wind, torsion, etc. . . . ); this allows the optimization of each part's profile design to minimize weight while ensuring that various loading condition requirements are met, and any bending, tension or compressive buckling failures are anticipated and designed around through appropriate cross-sectional design of the profiles.

I-beams In Relation to Mirror Geometry: (FIGS. 1-3, 5, 10)
The configuration of the upper I-beams to optimize mirror support in three planes approximates the shape of the parabolic mirror, minimizing the required lengths of the mirror support structures. Four of the eight locations are close enough that the longitudinal members can be efficiently designed as trapezoids with attachment legs so that no additional parts, fabrication or assembly is needed.

The two center bottom and two outside top positions have a position far enough between the mirrors 12 and the I-beams that an efficient means to bridge this gap is needed (one large cross sectional profile would weigh too much); using tubular profiles with a bottom attachment shape to tie the I-beam and tube together with a "cap" mirror support profile running the length of the frame 10 on top of the tubes was the most efficient use of material and fabrication/assembly costs.

Geometry:
Through structural engineering analysis and FEA, it has been verified that the struts are subject to axial loads in use with projected failure modes of compressive buckling normally being more critical than tensile failure. More nodes were used and more struts (the "5 triangle end view") to decrease strut lengths and thus increase the critical buckling loads, allowing us to use relatively thin-walled struts designed in cross section to extrude and fabricate efficiently and to maximize buckling and tension performance with relatively low weight/ft (to save on material cost). More nodal connections also allow the forces to be more uniformly distributed as the mirrors tilt throughout the day, shifting the weight and the applied wind loads and torsion.

Efficient Assembly:
The present method of assembly uses an on-site roller frame to hold the chords that run the entire length of the truss. Several people will be sitting in between these members, able to reach the long members and assemble the frame 10 as it rolls past them. Each set of rollers could consist of two rollers angled inward (other configurations are certainly possible and will be evaluated). This, combined with the weight of the frame 10, will keep everything securely seated in the apparatus. After each connection within reach has been attached, the frame 10 will be rolled to its next stage (the people assembling it will remain stationary), and the next sets of connections can be made. This process will be repeated until the entire frame 10 is assembled, as it rolls out onto some sort of rolling support (for instance, tires aligned under the 3 bottom long members).

With a limited amount of steps per assembler, the assembly will run smoother and increase quality. It is likely that separate material handlers will bring the preassembled strut/strut end piece assemblies, the chord sleeves and the various fasteners to each of the assembly personnel's locations on site, so that the assembly personnel do not waste time gathering components. The entire assembly system is envisioned to be mobile so that as frames 10 are assembled in the fields in the system, the completed frames can be lifted off of the exit support rollers and placed onto the completed uprights already mounted onto the foundations. In addition, because these frames are typically located in very hot, arid areas (exceptional sunshine throughout the year), the "on-site factory assembly system" enables the operators to be working under an awning with appropriate cooling fans aimed at them—this will further reduce assembly issues working in hot conditions; comfortable workers are more efficient and produce higher quality products.

Struts

Strut Geometry: (FIGS. 1-27)

The present strut design utilizes a thin-walled circular cross-section (FIGS. 15-20) to maximize the moment of inertia and radius of gyration while keeping a small area (weight), maximizing the critical buckling load. Through Finite Element Analysis iterations showing the expected tensile and compressive load characteristics we were able to fine tune the profile geometry/shape to achieve optimal weight to strength ratios and cross section/diameter/wall thickness optimal for each strut's unique loading conditions and length.

Strut Features:

The struts may feature drill guides to facilitate fabrication. The struts may utilize flat sections to match up to the extruded and fabricated strut end pieces. Depending on the loading conditions (tensile and compressive), type of fastener, fastener diameter and # of fasteners can be adjusted as appropriate.

Chords/longitudinal members: (FIGS. 1-7, 9-14, 28-34)

There are three types of longitudinal members (chords) which run the full length of the frame 10 (although these can of course be assembled from shorter lengths fastened together; most loads on space frames are axial). Due to the geometry of the solar trough frame 10 and the expected weight, wind loads and torsional/rotational loads that the completed assemblies will be subject to, and the geometries that each must meet, there are two different designs (discussed above): two various profile designs of "D's" (FIGS. 28 and 29) and one "collapsed trapezoid" (FIG. 30). Each is designed to most optimally utilize the extruded material according to the structural engineering and FEA analyses, while minimizing the total weight of the solar trough frame 10 system.

Connectors

Self-Guiding Chord Sleeve Connectors: (FIGS. 1-7, 9-14, 31-34)

These connectors consist of a chord sleeve that may only fit over the chord member in the correct configuration with at least one are fin on the chord sleeve used to connect the chords to the struts or to the I-beams (directly or through strut end pieces). By using connectors that are pinned (or otherwise fastened) in place along the chord members, there is a large reduction in required materials, as the fin(s) that are used to attach to the struts are only present where they are needed. These will be fastened to the chords preferably across parallel walls with chord fasteners and may feature drill guides for assembly and fabrication ease. The chord sleeves and the strut end pieces (in fact all fastened parts) are designed with careful consideration to hole-to-edge distance and wall thickness to provide the most secure, lightest weight connection.

As noted elsewhere, the self-guiding chord sleeves slide onto the three "D" designs and the "collapsed trapezoid" in an efficient manner, and by nature of their smaller circle size enable the chord sleeves to have a smaller extrusion circumscribing circle size (hereafter called "circle size") which allows them to be extruded on a larger # of available extrusion presses.

The "self-guiding" refers to the ends of the chord sleeve fins and strut end piece fins including an angled entry point to facilitate sliding the parts together.

Strut End Pieces: (FIGS. 2, 3, 9-27, 31-40)

These strut end pieces facilitate easy assembly of the struts to the chords. These are either pre-drilled/punched or field fabricated (match drill/punch) and attach to the self-guiding chord sleeve connectors using fasteners; since they are within the cross section of the strut OD's (except for the height of the pop rivet heads), they may in fact best be factory assembled and shipped as a unit (a "strut assembly" of one strut with two strut end pieces fastened to it). The strut end pieces may utilize the flats on the inside of the struts to guide them into the correct configuration and a small stop may be incorporated to keep them inserted at the correct depth so no time and effort is wasted lining up the rivet holes. These extruded and cut to (short) length strut end piece parts are designed and drilled/pierced to match with the appropriate struts they will be inserted into. "Pop rivets" will be used to connect the two (2 to 6 of various diameters depending on loading expectations).

The preferred strut assembly method to fasten the strut end pieces to the strut, maintaining exceptional tolerances between the fastener holes on the strut end piece fins on each end of the strut is as follows:

1. Cut strut and strut end pieces to proper length
2. Position strut and strut end pieces properly and clamp
3. Drill or pierce strut fastener holes
4. Place and fasten strut fasteners to join strut end pieces to strut
5. Drill or pierce strut end piece fin holes This sequence allows the strut assembly to have the same hole tolerances as a single strut with holes in each end of it.

Please note that all calculations, material properties and safety factors were taken from the Aluminum Association Aluminum Design Manual, using the most conservative safety factors used for bridge calculations. For calculation purposes, all extruded materials are assumed to be 6105, 6005 or 6005A T6 (although other alloys could be possible). Rivets are assumed to be 2024 T4. All connections are conceived to be riveted with solid, semi tubular or blind rivets unless otherwise noted, but the assembly can work equally well with pinned, bolted or other fastening means which are also contemplated.

Parts Discussion, Listing and Description

The "Strut End Pieces" are designed to fit inside of the "circular w/ flats" struts (although other connection geometries (e.g. outside the struts) are possible), enabling these to be fastened to the chord sleeves, which in turn fit around and are fastened to the chords. For purposes of explanation, the following parts will be discussed (although the same principles apply to all of the other similar parts—just with different dimensions, # fins or slightly different configurations):

1. Part C1a (FIG. 28): Bottom Center Chord "D-shape") that runs the entire length of the solar frame (Part C1a is the "lighter" D used in 3 places (FIGS. 2, 3, 5, 6, 7, 9 and 12), while C1b (FIG. 29) is the "heavier" D used in 2 places (FIGS. 2, 3, 5, 6, 7, 13 and 14)
2. Part G (FIG. 34): Bottom Center Chord Sleeve that slides over Part C1a and is fastened to it (FIGS. 2, 3, 4, 5, 6, 7 and 12)

3. Part I2 (FIG. 25): Strut End Piece (with three "fins") for Strut M (FIGS. 2, 3, 8, 12, 16 and 25)
4. Strut M (FIGS. 2, 8, 12 and 16)
5. Part I3 (FIG. 23): Strut End Piece (with two "fins") for Strut P (FIGS. 2, 3, 8, 10, 11, 17, and 23)) 14, 19
6. Struts P&T (FIGS. 2, 3, 8, 9, 10, 11 and 17))

The Full List of Parts is as Follows:

Struts: Parts M, N, O, P, W & T (FIGS. 1-20) Strut End Piece Connectors: (General: See FIGS. 1-20; specific, see Figures noted below)

Parts I1 (for Strut U's) (FIG. 24)
I2 (for Strut M's) (FIG. 25)
I3 (for Strut P's) (FIG. 23)
I4 (for Strut O's) (FIG. 22)
I5 (for Strut W's) (FIG. 26)
I6 (for Strut N's) (FIG. 27)
I7 (for Strut T's) (FIG. 21)

I-beams: Part B used as Parts B1 (used in 2 places) and B2 (used in 1 place) (FIGS. 2-7, 9-11, 32, 35-40)

Part C1$a$: Bottom Center and upper left and right Chords ("D-shape") that run the entire length of the solar frame 10 (FIGS. 2-7, 9, 12 and 28)

Part C1$b$: Bottom left and right Chord (larger "D-shape") that run the entire length of the solar frame 10 (FIGS. 2-7, 13, 14 and 29)

Part F: Upper center left and right Chords (trapezoid shaped) that run the entire length of the solar frame 10 (FIGS. 2-7, 10, 11 and 30)

Part D: Upper left and right chord sleeves that slide over Part C1$a$ and are fastened to it (FIGS. 2-7, 9 and 31))

Part E: Upper center left and right chord sleeves that slide over Part F and are fastened to it (FIGS. 2-7, 10, 11 and 32)

Part G: Bottom Center chord Sleeve that slides over Part C1$a$ and is fastened to it (FIGS. 2-7, 12 and 34)

Part H: Lower left and right chord sleeves that slide over Part C1$b$ and are fastened to it (FIGS. 2-7, 13, 14 and 33)

Part M: Mirror support structure base (FIGS. 43 and 45)

Part Ja: Mirror support vertical tube (Part M fits into it and is fastened as the "base") (FIG. 41-43)

Part Ka: Mirror support structure cap that runs the entire 12 meter length of the frames (FIGS. 43 and 44)

This "caps" Parts Ja and is fastened to each of them to create planes upon which the mirrors 12 can be mounted at the points of greatest distance from the I-beams Part L: Mirror rail (2 pieces), Part L1$b$: Mirror rail (2 pieces) and Part L1$m$: Mirror rail (2 pieces):

These six pieces each run the entire 12 meter length of the frames and are fastened to the I-beams (Parts Q&R) to provide surfaces onto which the mirrors 12 can be mounted (FIGS. 46-48)

Myriad of Solid, Semitubular and Blind Rivets, Pins, Bolts, Washers and Nuts, Etc. . . .

Overview:

The entire Solar Trough Frame 10 was designed for ease of extrusion, fabrication and assembly with structural engineering calculations and FEA modeling verifying and fine-tuning the concepts and design to optimize the system in terms of extrudability, part weight and fabrication and assembly ease, while exceeding all structural and functional requirements (although extrudability, fabrication and assembly ease also certainly affect the total system cost, the part weight is particularly important). The description below refers to the six parts detailed above, but the same design concepts and fabrication/assembly/fastening philosophies apply to many other of the chord, chord sleeves, struts and strut end pieces, as well as the other components such as the modified I-beams used in the design.

The structure is designed as a "pinned" assembly, with the struts thus subject to compressive or tensile axial loads. The structural engineering calculations and FEA verification established the maximum tensile or compressive loads for each component. These maximum loads were used to specifically design each strut (M, P & T), strut end piece (I2 and I3) and the "fins" on the strut end pieces and bottom chord sleeve (I2, I3 and G). The interior of each strut (M, P & T) may have a flat section of a certain width designed to mate with an associated flat section width of each strut end piece (I2 and I3).

The Solar Trough Frame 10 design shown uses seven extruded profiles that run the entire 12 meter length of the frame 10 (Parts C1$a$ (used in three places), C1$b$ (used in two places) and F (used in two places)). These chords are each surrounded by chord sleeves (parts D (used in 2 places), E (used in two places), G (used in 1 place) and H (used in two places). Struts with strut end pieces connect these seven assemblies in various specifically designed angled planes to create a 3 dimensional truss structure. When looking at the frame 10 from the end view there are 5 triangles. There is a central triangle composed of struts with the "base" of the triangle facing upwards (Triangle 1) attached to the horizontal I-beam (Part R), two triangles flanking Triangle 1 on either side with their "bases" facing down (Triangles 2 left and 2 right) and then two more triangles (Triangle 3 left and Triangle 3 right), flanking Triangle 2 left on the left and Triangle 2 right on the right with their more severely angled "base" facing up and attached to the slanted I-beams (Parts Q).

Triangle 1 is comprised of three corners: the bottom is chord sleeve Part G and the upper left and right are chord sleeves Part E. Triangle 2 left is comprised of three corners: the bottom most being chord sleeve Part G and the left bottom chord sleeve Part H, with the top chord sleeve Part E.

Triangle 2 right is comprised of three corners: the bottom most being chord sleeve Part G and the right bottom chord sleeve Part H, with the top chord sleeve Part E.

Triangle 3 left is comprised of three corners: the bottom most being chord sleeve Part H and the top right chord sleeve E, with the top left chord sleeve D.

Triangle 3 right is comprised of three corners: the bottom most being chord sleeve Part H and the top left chord sleeve E, with the top right chord sleeve D.

While when looking at an end view the assembly gives the impression of these 5 triangles all in the same plane, a review of the side view will show that the various struts actually are also placed at angles not coplanar with the end view.

1. Description
   a. Part C1$a$: Bottom Center Chord ("lighter" "D-shape") that runs the entire length of the solar frame
      i. The shape configuration and wall thickness of this part were designed to provide the necessary ability to handle the tensile, compressive and bending loads placed onto it. This piece has multiple lengths of Part G (Bottom Center Chord Sleeve) slid over it and fastened. Besides providing the tensile, compressive and bending strength, Part C1$a$'s "D" shape enables Part G to be slid over it and oriented reliably such that the various fins on all mating parts align properly.
   b. Strut M (12 pieces)
      i. The FEA verified maximum tensile force is 2,160 lbs and compressive force is 2,520 lbs.

ii. The strut cross section was designed to ensure that the tensile and compressive forces possible under the most severe loading conditions are handled with more than the conservative bridge safety factors. The strut length and strut end pieces allow an "effective strut length" to be calculated. The section's effective length, cross sectional area, and radius of gyration are used to calculate allowable compressive and tensile forces before failure (including buckling, which was the normal predicted failure mode of most of the strut assemblies, given their slenderness ratio).

iii. The tensile and compressive stresses predicted led to the calculation of the number of blind 5/16" aluminum rivets that would be required to properly secure the strut end pieces to the strut (other fastener types, number of fasteners and size can be used as long as they can carry the necessary shear stresses and the bearing loads are acceptable).

c. When a simple Part G "fin" to Part I2 or I3 "fin" connection was contemplated, the fastener diameter was rather large to handle the predicted loads with the needed safety factor. While the design would allow many types of fasteners (pins, bolts, or rivets (solid, semitubular or blind)), we designed it capable of being assembled with rivets capable of setting via hand squeezers (C or Alligator jaws). To accomplish the needed maximum of the tensile and compressive capacity with safety factor, while still using a rivet diameter capable of being hand squeezed, we needed to create multiple shear points on the rivets via interlocking "fins" on Part G and the mating strut end pieces, Parts I2 and I3. The cut lengths of the individual strut end pieces were calculated, and the flat "ID" of their associated struts designed to ensure that they both "fit" and could carry the necessary loads and stresses, given the "fin" or "tab" widths, thicknesses and fastener hole diameters.

Part G: Bottom Center Chord Sleeve that Slides Over Part C1a and is Fastened to it (Likely Pinned, Riveted or Bolted).

i. This part is configured to allow multiple struts at various compound angles to be fastened to it (Struts M, P & T via their respective Strut End Pieces (I2, I3 and I4), respectively) and also to allow Strut N and other Strut End Piece I6 to connect to Part G. Looking at an end view of the assembly and the extrusions shows how the angles for each of the struts in one dimension are defined. The "fins" on Part G interface with the "fins" on the Strut End Pieces. The faces of each allow close connections to minimize fastener bending and allow Parts I2 and I3 to be positioned both along the length of Part G and at the appropriate angle (looking at a side view of the assembly) as required. Each connection is designed to be secured with a fastener, such as a bolt, pin or rivet (blind, solid, semi tubular or other).

ii. The fin designs are such as with other cases throughout the frame 10 design, that the loads converge on an essentially common central point to avoid creating complex moments in Part G (this design philosophy is used with the other components in the structure as well).

iii. Part G is designed to keep a relatively small circle size (5.94 inches, extrudable on the most common 7" extrusion press diameter) to allow this part to be extruded on a variety of extrusion presses commonly available (where possible, we maintained lower circle sizes than other designs to allow flexibility in choosing which suppliers and which of their extrusion operations could actually extrude the parts).

iv. Each of the fins on Part G is specifically designed to both provide the mating portion to correctly interface with the strut end piece fins 24 and to ensure that they are both strong enough in tensile and compressive capacity and bearing and extrudable at the same time. FEA analysis was used to precisely determine the tensile and compressive loads on each strut and thus on each of their connectors as well. "Pinned" fasteners were used for the FEA, which can be accomplished via pins, rivets, bolts or other means. For sizing purposes, the maximum tensile and compressive loads were used to size rivets with single or multiple "shear points" in a way such that smaller diameter rivets could be used where needed, while still providing the necessary load capacity. Single fins on the chord sleeves can be used, but in this specific example, sizing the parts and geometries to allow the use of hand set rivets, for example, multiple "fins" on Part G and the various strut end pieces (Parts I2 and I3) allowed for the hole diameters to be minimized, keeping the circle size of all of the parts within readily available commercial extrusion operation limits.

d. The specific design of the fins ensures that they can carry the necessary loads, provide appropriate bearing strength for the fasteners and mating parts, provide mating surfaces for the strut end pieces (Parts I2 and I3) and to ensure that they are of such a configuration that the "extrusion tongue ratio" is acceptable from an extrusion and extrusion tooling perspective. The "extrusion tongue ratio" is critical, as for parts such as G with a long void between the fins, the ratio is defined as the area of the die tongue/(the base width of the tongue^2). The design we developed ensures that Part G and the mating strut end pieced parts I2 and I3 can be rotated around the fastener to create the appropriate truss angles, while not having the straight cut ends for the parts, each of which are cut to a particular length, interfere with the mating part upon rotation. The "end-to-hole" design is such to guarantee that the fins can support the needed compressive and tensile loads transmitted through the fasteners, and yet create the largest "base" of the tongue to maintain the tongue ratios below industry preferred 3:1.

e. Part I2: Strut End Piece (with three "fins") for Strut M i. As described above, this part cross section was designed to carry the needed loads and with the three "fins" to create four shear points on the fastener which connects it to Part G.

ii. Using 5/16" diameter blind aluminum rivets, four rivets are required to carry the FEA predicted loads.

iii. There may be an "end stop" designed into each of the strut end pieces to provide a positive "stop" against which the cut strut extrusions bear to ensure accurate strut to strut end piece orientation and location.

f. Part I3: Strut End Piece (with two "fins") for Struts P i. Same discussion as for Part I2, but the lower load requirements of Struts P led to only three fastener shear points required holding these to Parts G, and thus they only have 2-vs-3 "fins"

g. Struts P&T
  i. Similar discussion to Strut M, but smaller loads=smaller cross sections, etc.

While the term "riveted" is used, other fastening methods are contemplated and may be used in the solar trough frame 10 construction.

Struts transfer loads axially.

All chord sleeves (D, E, G and H) are fastened to their respective chord members (C1a, F, C1a and C1b respectively) via blind rivets to keep the chord sleeve located axially along the main chord members.

Mirror→Mirror Supports (Ka, L1b, L1m and L)→I-Beams (Parts B1 and B2)

The parabolic mirrors 12 are attached to the frame 10 via support bolts extending from the back of the parabolic mirrors 12, connected to the mirrors 12 by a ceramic pad (this is a commercially available mirror system from Flabeg (RP3), although the frame designs could easily be modified to handle other mirror systems). These connect the mirrors 12 to parts Ka, L1b, L1m and L; the bolts are part of the mirror 12 and are inserted through holes in these parts, secured with nuts and washers from the underside of the parts. These bolts attach the mirrors 12 to parts Ka, L1b, L1m and L to support the mirrors 12 whatever orientation the frame 10 is (the frame 10 rotates to follow the sun). The entire solar trough is designed to handle the worst case conditions of the weight of the mirrors 12, the frame 10 itself and the wind loads (and associated twisting loads (described later) which the positioning and wind conditions place on the system.

Parts L1b, L1m and L are in turn directly riveted to the I-beams. Part Ka is placed over and riveted to Part Ja, and Ja is placed over and riveted to Part M (see drawings); Part M is then riveted to the I-beam.

The loads transfer from the mirror bolts to Parts Ka, L1b, L1m and L and then to I-beams B1 and B2 (either through Parts L1b, L2m and L or through Ka to Ja to M).

Strut End Pieces (I1, I2, I3, I4, I5, I6 and I7)→Struts (Struts M, U, T, P, W, N and O)

Each strut has an associated Strut End Piece which fits inside it and is blind riveted (or otherwise pinned or fastened) to the flat portions (if flats are used) of the ID of the struts.

Strut End Pieces to Chord sleeves (Parts G, H, D & E)

I-Beams (Parts B1 and B2) (+Spacers: Parts S and S1)→Strut End Pieces (Parts I1 and I7)

Spacers S1 sits directly under the bottom flanges of the I-beam B2 (which is used at the "base" of the parabola). It is fastened (likely bolted due to the forces involved and resulting required fastener diameter) and used to provide additional tensile and compressive strength to the strut end piece (Part I1) to I-beam flange connection and to create a large enough gap on the strut end piece (Part I1) to allow the strut end piece to have sufficient tongue support for extrusion purposes. Modifications to the I-beam profile may allow the design to be accomplished without these spacers. Strut U is attached to Strut End Piece Part I1 via blind rivets or other fasteners. Part I1 surrounds and is fastened to the "sandwich" of the bottom flange of I-beam B2 and Spacer S1.

Spacers S sits directly under the bottom flanges of the I-beam B1 (which is used in two places as the left and right "legs" of the parabola). It is fastened (likely bolted due to the forces involved and resulting required fastener diameter) and used to provide additional tensile and compressive strength to the strut end piece (Part I7) to I-beam flange connection and to create a large enough gap on the strut end piece (Part I7) to allow the strut end piece to have sufficient tongue support for extrusion purposes. Strut T is attached to Strut End Piece Part I7 via blind rivets (or other fasteners). Part I7 surrounds and is fastened to the "sandwich" of the bottom flange of I-beam B1 and Spacer S.

Struts T and U are used to keep the I-beams B1 and B2 parallel, counteracting any forces from weight or wind.

Part E (Chord Sleeve)→I-Beams (B1 and B2), Part G (Chord Sleeve)/Part C1a (Chord Member), Part H (Chord Sleeve)/Part C1b (Chord Member), Part D (Chord Sleeve)/Part C1a (Chord Member)

The angled legs of Part E (along the 4.926" dimension) are fastened to the bottom flanges of I-beams B1 and B2 (likely bolted due to load requirements and resulting fastener diameters). Any loads from the mating portions of I-beams B1 and B2 are transferred through Part E (chord sleeve) to Part F (chord member) and through strut end pieces 13 and 14 to Struts P and O. Strut P then transfers axial loads to Part G at the base of the solar frame (and then to chord member C1a and Struts N and M through strut end pieces I6 and I2 respectively). Strut O then transfers loads to strut end piece I4, then to chord sleeve H and to chord member C1b; Chord sleeve H supports loads from Strut W through strut end piece I5 and Strut N and M through strut end pieces I6 and I2 respectively).

The upper left and right "legs" of the parabola I-beams B1 are connected to chord sleeve D. Part C1a (identical extrusion to that used in Part G chord sleeve) goes through the center of Part D. The angled fins on chord sleeve D connect to the fins on strut end piece I5 which in turn is attached inside of Strut W.

The weight and wind loads are transferred through this assembly.

Frame 10 Mounts→Mounting Towers

All of the forces of the frame 10 and mirror 12 weights and wind loads are eventually supported by frame 10 mounts at each end of the solar trough frame 10. At the ends of the 12 meter solar trough frame 10 there are assemblies which support the ends of the solar trough frame 10 and transfer the loads to a rotating (customer supplied) mechanism on top of customer supplied towers mounted on concrete foundations. They are triangular assemblies of I-beams (conceived as 2.5" top flange, 4.0" bottom flange (each with 0.187" walls) and a total height of 3"), although specific customer requirements will likely change the form of these end supports.

How the motor will rotate the mirrors 12:

The solar frames are arranged end to end with a motive force applied, for example, between frames 4 and 5 (of an 8 frame line for this example). Frame 1 is linked to 2, 2 to 3 and 3 to 4, and frame 8 to 7, 7 to 6, and 6 to 5. Between frames 4 and 5 there will be an electric or hydraulic motor mounted on a stand and powering a gearbox with a two sided power takeoff shaft in line with the rotational axis of the solar frames—each side of the power takeoff is attached to frames 4 and 5 respectively. The motor drives the gearbox which in turn rotates frames 4 and 5 at the same time. Frames 3-2-1 and 6-7-8 rotate in concert due to their attachment to frames 4 and 5 respectively. The motor/gearbox establish the rotational orientation of the line of frames, holding them in position against weight and wind loads, and rotating them to follow the traverse of the sun across the sky.

Description of Part D:

Part D is the chord sleeve which surrounds Part C1a (a "D" shape, coincidentally, which is a chord member running the full 12 meter length of the frame). Part D is fastened to part C1a to position it along the length of C1a. Part D is also fastened to I-beam part B1 and to the strut end connectors for Strut W, Parts I5. The "D" shape of Part D encompasses Part C1a providing resistance to rotation of chord sleeve D around the chord member C1a. The flat projections above and below the left edge of the "D" (viewed as the letter, not as used in the assembly) are pierced with holes to allow fastening to I-beam part B1. The connection point for Parts I5 are shaped with a larger bulge in the center to allow the corresponding "tongue" portion of I5 to have a wide enough "base" such that the [tongue area of I5/"base"^2] is 3 or less (the preferred "tongue ratio"-easier to extrude without the extrusion die "tongue" having excess deflection and breakage). The "end" of this connection point narrows down to the wall thickness required to carry the projected FEA tensile and compressive loads, with a length long enough that the hole to edge distance of the hole in the wide part of the "bulge" is at least 1.0× the diameter (actually, it is slightly greater than 1.0× the diameter). By narrowing the bulge back down to this required wall thickness, the area of the corresponding "tongue" of part I5 is kept as small as possible to keep the tongue ratio lower than 3.0.

How the Solar Frames are Mounted and Rotated

The concentrated solar thermal power plants are made up of thousands of frames. They are arranged in multiple parallel rows of mirrors 12, each row of which rotates to follow the progress of the sun across the sky to optimize solar reflection onto the receiver tube. The mirrors 12 are "linked" together in a row (FIG. 1) and a number of mirrors 12 are rotated at once, using electric or hydraulic motors with gear boxes.

Each individual mirror frame is supported by two deep concrete pads poured into the earth (with steel rebar) at each end of the mirror frame; these foundations are supplied by others. On top of each concrete pad are truss-like "uprights" (supplied by others). Each solar frame/mirror assembly is equipped with structural assemblies on each end; these are manufactured from structural extruded parts fabricated and assembled/fastened into structures which are then fastened to each end of the frame. The top of these structures will be located at the center of gravity of the frame/mirror combination (with the current design, this is just above the top surface of the mirror at the bottom of the parabola). Bearing devices (supplied by others) will be attached to the truss-like uprights and will attach to the structures at each end of the frame so that the frames can easily be rotated about their center of gravity, despite the total weight of the frames and mirrors 12.

Between each two frames are connecting mechanisms (supplied by others) that "tie" the two frames together so that they rotate around the same axis at the same time. If, for example, there are 18 frames in each row of mirrors 12, there will be a drive mechanism in the center, connected to frames 9 and 10 directly powering them. Frames 1-9 and 11-18 are then rotated because they are "tied" together between each frame. The rotation allows the mirror 12 to follow the sun across the sky. Due to wind conditions in the locations where these mirrors 12 are installed, the wind will want to rotate the mirrors 12. The connections between each two mirrors 12 linking back to the gear drive electric or hydraulic motor resists this force.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A frame for holding objects comprising:
   a plurality of chords;
   a plurality of extruded profiles, including chord sleeves and strut end pieces having strut end piece fins, the strut end piece fins have an extrusion tongue ratio of less than 3:1, each chord sleeve having at least one chord sleeve fin, each chord sleeve positioned about one of the chords;
   a plurality of struts, at least one of the struts supporting a compression force of 2520 lbs. and attached to one strut end piece having at least one strut end piece fin that connects with a chord sleeve fin to connect the plurality of chords, the strut end piece separate and distinct from the strut; and
   a platform supported by the chords and struts on which the objects are disposed, at least one chord sleeve with the chord sleeve fin and strut end piece having a circle size which fits within a 7 inch diameter extrusion press.

2. The frame as described in claim 1 wherein the strut end piece fins interface with the chord sleeve fins so that loads converge on a substantially common central point.

3. The frame as described in claim 2 wherein at least one strut intersects with at least one chord in a non-perpendicular fashion.

4. The frame as described in claim 3 wherein the chord sleeve fin and the strut end piece fin is thicker at a location through which a frame fastener extends than at the fin's tip.

5. The frame as described in claim 4 wherein each chord sleeve and strut end piece are made of aluminum.

6. The frame as described in claim 5 wherein at least one chord sleeve comprises:
   a chord sleeve primary portion having an opening in which the chord is disposed; and
   at least one said chord sleeve fin extending from the primary portion that is fixed to the strut end piece fin.

7. The frame as described in claim 6 including a chord sleeve fastener which fixes the chord sleeve primary portion to the chord, and a frame fastener which fixes the chord sleeve fin to the strut end piece fin.

8. The frame as described in claim 7 wherein the chord sleeve primary portion is a chord sleeve main profile and the chord sleeve fin is a chord sleeve boss extending from the chord sleeve main profile.

9. The frame as described in claim 8 wherein at least one strut end piece comprises:
   a strut end piece primary portion which attaches to the strut; and
   at least one said strut end piece fin extending from the strut end piece primary portion which attaches to the chord sleeve.

10. The frame as described in claim 9 including at least one strut end piece fastener which fixes the strut end piece primary portion to the strut, and a frame fastener which fixes the strut end piece fin to the chord sleeve fin.

11. The frame as described in claim 10 wherein the strut end piece primary portion is a strut end piece main profile and the strut end piece fin is a strut end piece boss extending from the strut end piece main profile.

12. The frame as described in claim 11 wherein the strut primary portion has a substantially flat side to align with a substantially flat side of the strut.

* * * * *